(12) United States Patent
Bathel et al.

(10) Patent No.: US 11,503,222 B2
(45) Date of Patent: Nov. 15, 2022

(54) COMPACT IMAGING SYSTEM USING A CO-LINEAR, HIGH-INTENSITY LED ILLUMINATION UNIT TO MINIMIZE WINDOW REFLECTIONS FOR BACKGROUND-ORIENTED SCHLIEREN, SHADOWGRAPH, PHOTOGRAMMETRY AND MACHINE VISION MEASUREMENTS

(71) Applicant: UNITED STATES OF AMERICA AS REPRESENTED BY THE ADMINISTRATOR OF NASA, Washington, DC (US)

(72) Inventors: Brett F. Bathel, Yorktown, VA (US); Stephen B. Jones, Newport News, VA (US); Joshua M. Weisberger, Newport News, VA (US)

(73) Assignee: UNITED STATES OF AMERICAS AS REPRESENTED BY THE ADMINISTRATOR OF NASA, Washington, DC (US)

( * ) Notice: Subject to any disclaimer, the term of this patent is extended or adjusted under 35 U.S.C. 154(b) by 40 days.

(21) Appl. No.: 17/001,037

(22) Filed: Aug. 24, 2020

(65) Prior Publication Data
US 2021/0058541 A1  Feb. 25, 2021
US 2022/0263995 A9  Aug. 18, 2022

Related U.S. Application Data

(60) Provisional application No. 63/024,958, filed on May 14, 2020, provisional application No. 62/935,516, (Continued)

(51) Int. Cl.
*H04N 5/235* (2006.01)
*G02B 27/14* (2006.01)
(Continued)

(52) U.S. Cl.
CPC ......... *H04N 5/2354* (2013.01); *G02B 27/149* (2013.01); *G03B 15/05* (2013.01);
(Continued)

(58) Field of Classification Search
CPC .. H04N 5/2354; H04N 5/2256; H04N 5/2254; H04N 5/2253; H04N 7/18;
(Continued)

(56) References Cited

U.S. PATENT DOCUMENTS 3,511,462 A  5/1970 Bazignan
4,655,548 A  4/1987 Jue
(Continued)

OTHER PUBLICATIONS

Raffel et al, Background-oriented schileren (BOS) techniques (Year: 2015).*
(Continued)

*Primary Examiner* — Tracy Y. Li
(74) *Attorney, Agent, or Firm* — Shawn P. Gorman; Robin W. Edwards; Helen M. Galus

(57) ABSTRACT

One aspect of the present disclosure is an imaging system including an optical sensor defining an optical axis. The system further includes a light source. The system may include an optical beam splitter, and may also include an optional diffusing lens that may be configured to diffuse and/or collimate light from the light source and direct light exiting the diffusing lens to the optical beam splitter. The optical beam splitter is configured to direct light from the light source along the optical axis of the optical sensor.

19 Claims, 23 Drawing Sheets

Related U.S. Application Data filed on Nov. 14, 2019, provisional application No. 62/890,161, filed on Aug. 22, 2019.

(51) Int. Cl.

| | |
|---|---|
| *G03B 15/05* | (2021.01) |
| *H04N 5/225* | (2006.01) |
| *G06T 11/00* | (2006.01) |
| *H04N 7/18* | (2006.01) |
| *H04N 5/247* | (2006.01) |

(52) U.S. Cl.
CPC ......... *G06T 11/003* (2013.01); *H04N 5/2253* (2013.01); *H04N 5/2254* (2013.01); *H04N 5/2256* (2013.01); *H04N 5/247* (2013.01); *H04N 7/18* (2013.01); *G03B 2215/0567* (2013.01); *G03B 2215/0582* (2013.01); *G03B 2215/0592* (2013.01); *G06T 2207/10072* (2013.01)

(58) Field of Classification Search
CPC .... H04N 5/247; H04N 5/2258; G02B 27/149; G02B 27/14; G03B 15/05; G03B 2215/0567; G03B 2215/0582; G03B 2215/0592; G03B 15/03; G06T 11/003; G06T 2207/10072
USPC ......................................................... 348/159
See application file for complete search history.

(56) References Cited

U.S. PATENT DOCUMENTS

| | | | | |
|---|---|---|---|---|
| 5,515,158 | A | 5/1996 | Heineck | |
| 6,290,382 | B1* | 9/2001 | Bourn ................ | G01N 21/8806 362/294 |
| 2004/0136041 | A1* | 7/2004 | Togino ................ | G02B 26/108 359/225.1 |
| 2014/0139807 | A1* | 5/2014 | Uchiyama .............. | A61B 3/135 351/214 |
| 2015/0370039 | A1* | 12/2015 | Bone .................. | G02B 13/0035 359/715 |
| 2016/0132702 | A1* | 5/2016 | Digiovanna ....... | G06K 7/10821 235/438 |
| 2019/0084676 | A1* | 3/2019 | Hallissy .................... | B64D 1/02 |
| 2019/0183337 | A1* | 6/2019 | Neal .................... | A61B 9/00804 |

OTHER PUBLICATIONS

Dalziel et al. "Whole-field Density Measurements by 'Synthetic Schlieren'," Experiments in Fluids, vol. 28, No. 4, 2000, pp. 322-335.
Raffel et al., "On the Applicability of Background Oriented Optical Tomography for Large Scale Aerodynamic Investigations," Experiments in Fluids, vol. 28, No. 5, 2000, pp. 477-481.
Raffel et al., "Background Oriented Stereoscopic Schlieren (BOSS) for Full-scale Helicopter Vortex Characterization," 9th International Symposium on Flow Visualization, 2000, pp. 450-451-450-11, Heriot-Watt University, Edinburgh.
Richard et al., "Principle and Applications of the Background Oriented Schlieren (BOS) Method," Measurement Science and Technology, 2001, pp. 1576-1585, vol. 12, No. 9.
Guizar-Sicairos et al., "Efficient Subpixel Image Registration Algorithms," Optics Letters, 2008, pp. 156-158, vol. 33, No. 2.
Raffel, M., "Background-oriented Schlieren (BOS) Techniques," Experiments in Fluids, 2015, pp. 1-17, vol. 56, No. 60, Springer.
Micol et al., "Langley Aerothermodynamic Facilities Complex: Enhancements and Testing Capabilities," 36th AIAA Aerospace Sciences Meeting and Exhibit, American Institute of Aeronautics and Astronautics, 1998, pp. 1-28, Reno, NV.
Berger et al., "NASA Langley Aerothermodynamics Laboratory: Hypersonic Testing Capabilities," 53rd AIAA Aerospace Sciences Meeting, American institute of Aeronautics and Astronautics, 2015, pp. 1-21.
Erickson et al., "Overview of Supersonic Aerodynamics Measurement Techniques in the NASA Langley Unitary Plan Wind Tunnel," Tech, rep., NASA Langley Research Center, 2007, pp. 1-107, Hampton, VA.
Kmak, "Modernization and Activation of the NASA Ames 11- by 11-Foot Transonic Wind Tunnel," 21st Aerodynamic Measurement Technology and Ground Testing Conference, American Institute of Aeronautics and Astronautics, 2000, pp. 1-17, Denver, CO.
Corlett, "Operational Flow Visualization Techniques in the Langley Unitary Plan Wind Tunnel," Tech, rep., NASA Langley Research Center, 1982, pp. 65-73, Hampton, VA.
Garbeff, et al., "Wind Tunnel Flow Field Visualizations of the Space Launch System Vehicle Ascent," AIAA Aviation 2019 Forum, 2019 pp. 1-17.
Winski et al., "Space Launch System Booster Separation Supersonic Powered Testing with Surface and Off-body Measurements," AIAA Aviation 2019 Forum, 2019, pp. 1-24.
Atcheson et al., "Time-resolved 3D Capture of Non-stationary Gas Flows," 2008, pp. 1-9, vol. 27, No. 5.
Grauer et al., "Instantaneous 3D Flame Imaging by Background-oriented Schlieren Tomography," Combustion and Flame, 2018, pp. 284-299, vol. 196.
Zhang et al., "Quantitative Reconstruction of 3D Flow Density Fields by a Direct Computerized Tomography Method of BOS," Optical Metrology and inspection for Industrial Applications V, 2018, pp. 1-12, Beijing, China.
Liu et al., "kHz-rate Volumetric Flame imaging Using a Single Camera," Optics Communications, 2019, pp. 33-43, vol. 437.
Liu et al.,"Time-resolved Three-dimensional Imaging of Flame Refractive Index via Endoscopic Background-Oriented Schlieren Tomography Using One Single Camera," Aerospace Science and Technology, 2020, pp. 1-7, vol. 97.
Zeb et al., "Quantitative Measurement of Heat Flow in Natural Heat Convection Using Color-Stripe Background Oriented Schlieren (CSBOS) Method," Journal of the Japanese Society for Experimental Mechanics, 2011, pp. 141-146, vol. 11.
Hartmann et al., "Tomographic Background Oriented Schlieren Applications for Turbomachinery," 53rd AIAA Aerospace Sciences Meeting, American institute of Aeronautics and Astronautics, 2015, pp. 1-10, Kissimmee, FL.
Venkatakrishnan et ail., "Density Field of Supersonic Separated Flow Past an Afterbody Nozzle Using Tomographic Reconstruction of BOS Data," Experiments in Fluids, 2009, pp. 463-473, vol. 47, Springer.
Todoroff et al., "3D Reconstruction of the Density Field of a Jet Using Synthetic BOS Images," 15th International Symposium on Flow Visualization, 2012, pp. 1-10, Minsk, Belarus.
Adamczuk et al., "Experimental Demonstration of Analyzing an Engine's Exhaust Jet with the Background-Oriented Schlieren Method," AIAA Ground Testing Conference, American institute of Aeronautics and Astronautics, 2013, pp. 1-10, San Diego, CA.
Todoroff et al., "Reconstruction of instantaneous 3D Flow Density Fields by a New Direct Regularized 3DBOS Method," 17th International Symposium on Applications of Laser Techniques to Fluid Mechanics, 2014, pp. 1-12, Lisbon, Portugal.
Donjat et al., "Study of a Co-flowing Hot Jet: an Appiicaticn of Direct 3DBOS Technique in Research Wind Tunnel," 10th Pacific Symposium on Flow Visualization and Image Processing, 2015 pp. 1-9, Naples, Italy.
Hartmann et al., "Combining ART and FBP for improved Fidelity of Tomographic BOS," Measurement Science and Technology, 2016, pp. 1-11, vol. 27, No. 9.
Lang et al., "Measurement of the Fluctuating Temperature Field in a Heated Swirling Jet with BOS Tomography," Experiments in Fluids, 2017, pp. 1-21, vol. 58, No. 7, Springer-Verlag.
Nicolas et al., "Experimental Study of a Co-flowing Jet in ONERA's F2 Research Wind Tunnel by 3D Background Oriented Schlieren," Measurement Science and Technology, 2017, pp. 1-16, vol. 28, No. 8.

(56) References Cited

OTHER PUBLICATIONS

Amjad et al., "Time-Averaged Three-Dimensional Density and Temperature Field Measurement of a Turbulent Heated Jet Using Background-Oriented Schlieren," 21st Australasian Fluid Mechanics Conference, 2018, pp. 1-5, Adalaide, Australia.

Nicolas et al., "Experimental Study of a Counter-flow Jet in ONERA's SIMA Wind Tunnel by 3D Background Oriented Schlieren," 18th International Symposium on Flow Visualization, 2018, pp. 1-12, Zurich, Switzerland.

Ota et al., "Computed-tomographic Density Measurement or Supersonic Flow Field by Colored-grid Background Oriented Schlieren (CGBOS) Technique," Measurement Science and Technology, 2011, pp. 1-8, vol. 22, No. 10.

Sourgen et al., "Reconstruction of the Density Field Using the Colored Background Oriented Schlieren Technique (CBOS)," Optics and Lasers in Engineering, 2012, pp. 29-28, vol. 50.

Leopold et al., "Reconstruction of the Unsteady Supersonic Flow Around a Spike Using the Colored Background Oriented Schlieren Technique," Journal of Flow Control, Measurement & Visualization, 2013, pp. 69-76, vol. 1.

Nicolas et al., "3D Reconstruction of a Compressible Flow by Synchronized Multi-camera BOS," Experiments in Fluids, 2017, pp. 1-9, vol. 58, No. 5, Springer.

Meyer et al., "High-speed, Three-dimensional Tomographic Laser-induced Incandescence Imaging of Soot Volume Fraction in Turbulent Flames," Optics Express, 2016, pp. 1-9, vol. 24, No. 26.

Halls et al., "kHz-rate rour-dimensional Fluorescence Tomography Using an Ultraviolet-tunable Narrowband Burst-mode Optical Parametric Oscillator," Optica, 2017, pp. 897-902, vol. 4, No. 8.

Weisberger et al., "Preparations for Tomographic Background-Oriented Schlieren Measurements in the 11-by 11-foot Transonic Wind Tunnel," Jun. 15-19, 2020, pp. 1-22.

Lucas et al., "An iterative image Registration Technique with an Application to Stereo Vision," 7th International Joint Conference on Artificial Intelligence, 1981, pp. 674-679, Vancouver, British Columbia.

Horn et al., "Determining Optical Flow," Artificial Intelligence, 1981, pp. 185-203, vol. 17, No. 1.

Smith et al., "Optical Flow for Flight and Wind Tunnel Background Oriented Schlieren Imaging," 55th AIAA Aerospace Sciences Meeting, 2017, pp. 1-18, Grapevine, Texas.

Nicolas et al., "A Direct Approach for instantaneous 3D Density Field Reconstruction From Background-oriented Schlieren (BOS) Measurements," Experiments in Fluids, 2016, pp. 1-21, vol. 57, No. 13, Springer.

Grauer et al., "Fast and Robust Volumetric Refractive Index Measurement by Unified Background-oriented Schlieren Tomography," Experiments in Fluids, 2020, pp. 1-17. vol. 61, No. 3.

Schairer et al., "Predicting Camera Views for Image-Based Measurements in Wind Tunnels," 43rd AIAA Aerospace Sciences Meeting and Exhibit, American Institute of Aeronautics and Astronautics, 2005, pp. 1-15, Reno, Nevada.

Kushner et al., "Planning Image-Based Measurements in Wind Tunnels by Virtual Imaging," 49th AIAA Aerospace Sciences Meeting Including the New Horizons Fcrum and Aerospace Exposition, American Institute of Aeronautics and Astronautics, 2011, pp. 1-14, Orlando, FL.

Burgess et al., "Photographic Assessment of Retroreflective Film Properties," ISPRS Journal of Photogrammetry and Remote Sensing, 2011, pp. 743-750, vol. 66, No. 5.

Cook et al. , "Wavelet Noise," ACM Transactions on Graphics, 2005, pp. 803-811, vol. 24, No. 3.

Lucas et al., "An iterative image Registration Technique with an Application to Stereo Vision," 1981, pp. 121-130.

Bathel et al., "Development of Tomographic Background-Oriented Schlieren Capability at NASA Langley Research Canter," NASA Langley Research Center, AIAA Aviation 2019 Forum, Jun. 14, 2019, pp. 1-18, Hampton, VA.

* cited by examiner

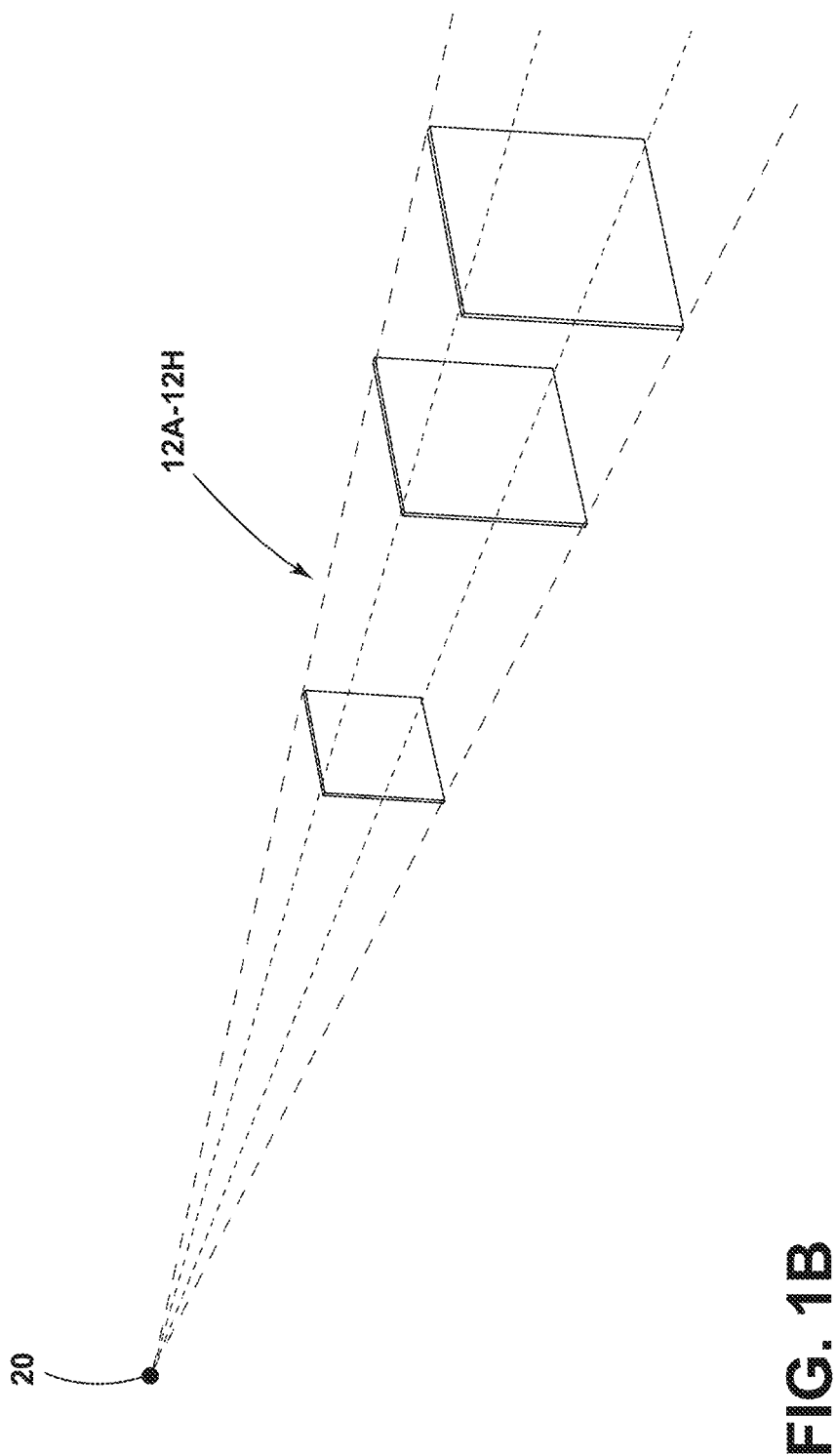

COMPACT IMAGING SYSTEM USING A CO-LINEAR, HIGH-INTENSITY LED ILLUMINATION UNIT TO MINIMIZE WINDOW REFLECTIONS FOR BACKGROUND-ORIENTED SCHLIEREN, SHADOWGRAPH, PHOTOGRAMMETRY AND MACHINE VISION MEASUREMENTS

CROSS-REFERENCE TO RELATED PATENT APPLICATION(S)

This patent application claims the benefit under 35 U.S.C. § 119(e) to U.S. Provisional Patent Application No. 63/024,958, filed May 14, 2020, entitled "COMPACT IMAGING SYSTEM USING A CO-LINEAR, HIGH-INTENSITY LED ILLUMINATION UNIT TO MINIMIZE WINDOW REFLECTIONS FOR BACKGROUND-ORIENTED SCHLIEREN AND MACHINE VISION MEASUREMENTS," which is incorporated by reference in its entirety for any and all non-limiting purposes.

STATEMENT REGARDING FEDERALLY SPONSORED RESEARCH OR DEVELOPMENT

Joint Government, Large Business, Small business or Nonprofit Organization Invention: The invention described herein was made in the performance of work under NASA contracts and by an employee/employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore. In accordance with 35 U.S.C. § 202, the contractor elected not to retain title.

BACKGROUND

Various imaging techniques have been developed to produce images showing variations in density of a gas or other material having density gradients. These imaging techniques may be used in wind tunnels or other creations involving flow of air and/or other materials. Known imaging techniques include schlieren and shadowgraph imaging techniques. In known schlieren techniques, a direct line-of-sight through the test section, a set of high quality lenses or mirrors, and a point illumination source are all typically required for a measurement to be performed. Background-oriented schlieren techniques (BOS) have also been developed. BOS techniques may be sensitive to gradients in density. This sensitivity comes from measurement of small distortions in an image background pattern captured with and without the density gradients present in the test section (where the test section generally refers to anything between the camera and the background pattern). The relatively straight-forward equations that govern the apparent distortion absorbed in the image-background pattern make the BOS technique capable of providing quantitative information pertaining to the visualized density field. BOS differs from conventional schlieren techniques, where the imaged intensity variations are related to the density gradients in the test section. The use of a background pattern and camera permit the BOS technique to be scaled to an arbitrary field-of-view. Although this scalability may be achieved in some cases using direct shadowgraph, the shadowgraph method is primarily a qualitative tool. Multi-camera schlieren tomographic systems for wind tunnel measurements have also been developed. However, known imaging systems and techniques may suffer from various drawbacks.

BRIEF SUMMARY

One aspect of the present disclosure is an imaging system that may be utilized for BOS imaging applications, shadowgraph, photogrammetry, machine vision applications, and other applications. The system includes an optical sensor, such as a digital camera defining an optical axis. The system further includes a light source. The light source may comprise an LED or other suitable device. The system further includes an optical beam splitter, and may include an optional diffusing lens that is configured to diffuse and concentrate light from the LED light source and direct light exiting the diffusing lens to the optical beam splitter. The optical beam splitter is configured to direct light from the light source along the optical axis of the digital camera.

Light coupled onto the optical axis by the optical beam splitter may have a minimum cross-sectional size that is about equal to a size of the diffusing lens. The digital camera may include an imaging lens defining a lens diameter, and the light coupled onto the optical axis may have a minimum diameter that is at least as large as the lens diameter. This aspect of the design minimizes the presence of shadows projected onto the image plane, which may arise from refractive index gradients in the measurement region. The optical beam splitter may comprise a 50/50 beam-splitting plate, cube, or other suitable beam-splitting device. The light source may be configured to produce a short-duration, high-intensity illumination pulse. The duration may be less than about 10 microseconds, less than about 5 microseconds, or less than about 1 microsecond in certain embodiments, however, those of ordinary skill in the art will appreciate that other durations are within the scope of this disclosure. The duration and intensity of light may be set (adjusted) as required or beneficial for a particular application, and in certain embodiments the intensity may be substantially continuous. In general, shorter light pulses may be utilized, if required or beneficial, for higher flow velocities in high speed wind tunnels or other applications.

The digital camera, light source, optical beam splitter, and diffusing lens may be rigidly interconnected to form an imaging unit. A plurality of imaging units, each including a digital camera, a light source (e.g. LED), and an optical beam splitter may be utilized if required or beneficial for a particular application. The optical axes of the imaging units may be radially spaced about a test region. A system may include at least one background pattern aligned with each optical axis, whereby at least some light from the light source of each imaging unit is reflected back to the digital camera of each imaging unit, whereby the digital cameras capture images of the background patterns. The images include variations due to density gradients in a fluid in the test region, whereby the images can be processed to provide background-oriented schlieren (BOS) images. Each camera may be configured to provide a 2-dimensional BOS image, and synchronous images may be inputted to a tomographic algorithm to back out a tomographic reconstruction.

The system may include a controller, such as an electrical circuit programmable controller, or other suitable device. The controller may be configured to simultaneously actuate the digital cameras of each imaging unit, and to simultaneously actuate the light sources of each imaging unit. The controller may, optionally, be configured to generate a camera actuation signal to the digital cameras followed by an actuation signal to the light sources, whereby the electrical circuitry compensates for a time delay of the digital cameras relative to the light sources, and causes the light sources to generate a pulse of light in a manner that is synchronized with actuation of the cameras.

Each imaging unit may include a support structure, such as a housing, and the digital camera, light source, and optical beam splitter may be supported by the housing. Each imaging unit may be supported by an adjustable bracket having a first part and a base part. In accordance with one embodiment, the first part of the adjustable bracket may be rigidly connected to the housing. The first part of the adjustable bracket may also be adjustably connected to the base part, such that the first part can be rotated and translated relative to the base about three axes to a selected position. The imaging units may be utilized in a wind tunnel having sidewalls disposed about the test region. The sidewalls of the wind tunnel may include light-transmitting material forming windows, and the optical axis of each imaging unit may be aligned with an opening. The imaging units may be disposed outside of the wind tunnel with the optical axis of each camera passing through a window of the wind tunnel. The digital camera may optionally comprise a CMOS or CCD device, the light source may optionally comprise a blue, green, or red LED, and the optical beam splitter may comprise a 50/50 beam-splitting plate or cube. Alternatively, the light source may comprise a U.V. light source (e.g., LED). It will be understood that virtually any suitable light source may be utilized as required or beneficial for a particular application.

Another aspect of the present disclosure is an imaging system including a digital camera defining an optical axis and a light source that is configured to generate light traveling transverse relative to the optical axis of the digital camera. The imaging system further includes an optical beam splitter that is configured to couple light from the light source and direct a coaxial beam of light along the optical axis of the digital camera.

The imaging system may include an aperture positioned between the light source and the optical beam splitter to block a portion of the light from the light source such that only light traveling through the aperture reaches the optical beam splitter. The coaxial beam of light may be suitable for producing shadowgraphs.

Optionally, a diffusing lens may be positioned between the light source and the optical beam splitter, whereby light from the light source passes through the aperture and through the diffusing lens.

The imaging system may optionally include a substantially rigid support structure which may be in the form of a module, bracket, or housing. The digital camera, the light source, and the optical beam splitter may be secured to the substantially rigid housing to form an imaging unit.

Another aspect of the present disclosure is a method of generating images. The method includes providing a plurality of imaging units, each imaging unit including a digital camera defining an optical axis, a light source, and an optical beam splitter. The beam splitter is used to cause light from each light source to be coupled onto the optical axis of each digital camera in the form of a coaxial beam. The imaging units are positioned about a test space, and the coaxial beams of imaging units pass through a substance in the test space. The coaxial beams are reflected back to the digital cameras from background patterns. Data from the digital cameras may be processed to generate 2-dimensional or 3-dimensional tomographic background-oriented schlieren (BOS) images having features corresponding to pressure gradients of the substance. Alternatively, the data may be processed to provide 2-dimensional shadowgraphs or photogrammetry images.

The method may include positioning imaging units around a wind tunnel having a plurality of windows comprising light-transmitting material. The coaxial beams may pass through the windows into a gas or other substance in the test space.

The method may include activating the light sources of each imaging unit at substantially the same time to provide simultaneous pulses of light. The method may also include actuating the digital cameras of each imaging unit at substantially the same time, whereby the digital cameras capture light reflected back from the background patterns.

One or more embodiments of the present disclosure may optionally provide one or more of the following benefits or advantages:

Co-axial illumination minimizes reflections from windows in a wind tunnel.
  Co-axial illumination minimizes the presence of shadows cast by a wind tunnel model on background panels.
  Co-axial illumination provides for a high amount of returned light to the camera when using a retro-reflective background.
  Use of a condensing lens with a diffuser enlarges the apparent size of the light source such that it is generally of the same scale as the lens entrance aperture to minimize shadowgraph effects if required.
  The compact nature of the imaging units allows for measurements in wind tunnel facilities with severe working space restrictions.

These and other features of various embodiments will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1B is an isometric schematic of a camera field-of-view;

DETAILED DESCRIPTION OF THE INVENTION

Figure 1:
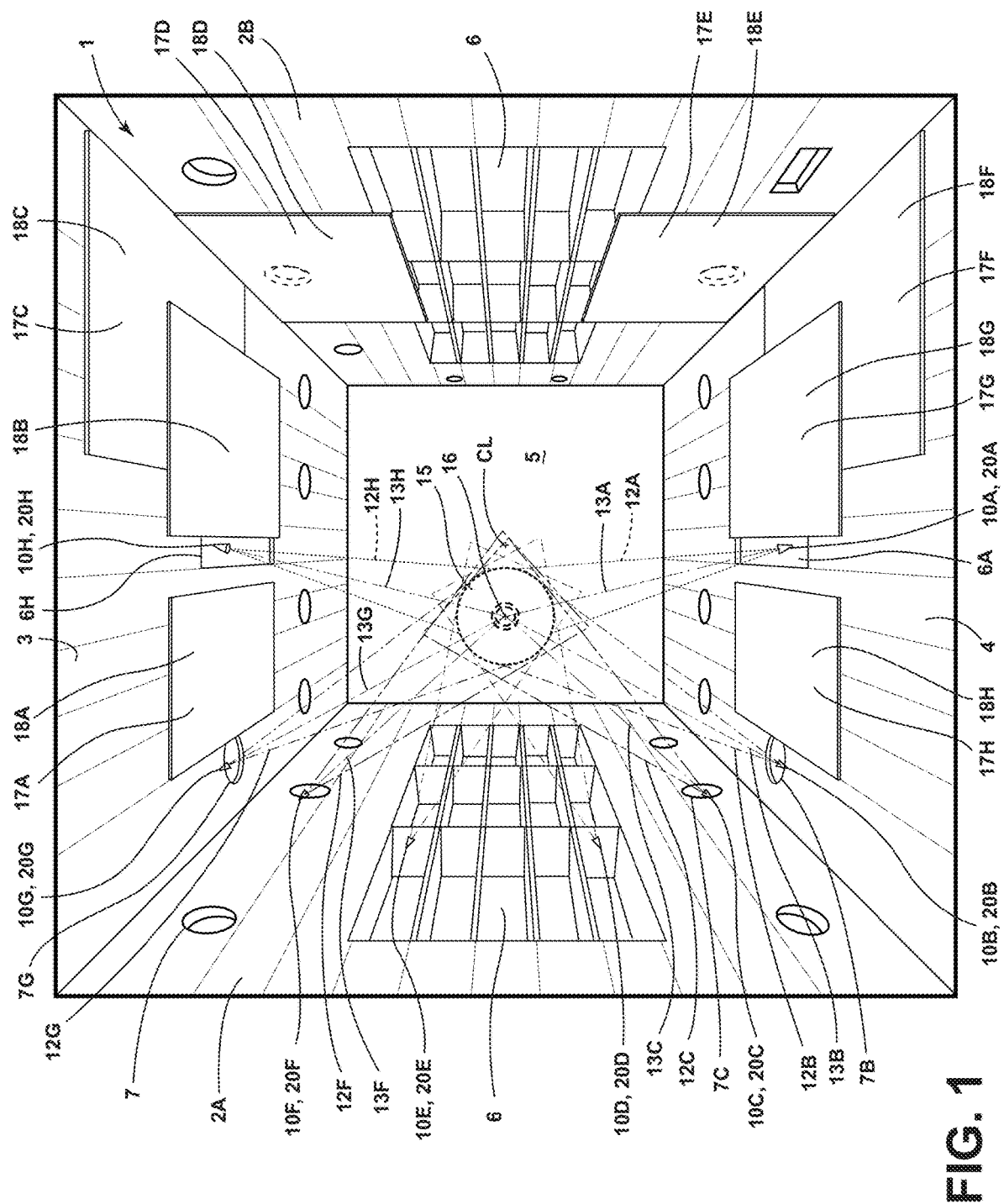
FIG. 1 is a partially schematic isometric view of a wind tunnel.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Further, although reference is made to commercially-available devices, such references are made solely to provide the reader with context of certain embodiments, and such reference is not to be implied as an endorsement or promotion of any commercial product, service, or activity.

A wind tunnel 1 (FIGS. 1 and 1A) may include sidewalls 2A, 2B, a sidewall or ceiling 3, and a sidewall or floor 4 positioned around a test region or space 5. FIG. 1 is a view looking downstream along the centerline (CL) of the wind tunnel 1. In use, fluid (e.g., air) flows through the wind tunnel 1 in a known manner. For example, the wind tunnel 1 may comprise an existing 11 foot×11 foot transonic wind tunnel. Alternatively, wind tunnel 1 may comprise a hypersonic wind tunnel for testing hypersonic flow. It will be understood, however, that the present disclosure is not limited to wind tunnels, or to a specific type of wind tunnel.

Example wind tunnel 1 includes a pair of side windows 6 and a plurality of round windows in the form of portholes 7. Wind tunnel 1 may also include a window 6H in ceiling 3 and a window 6A in floor 4. The side windows 6 and portholes 7 may include light-transmitting material (e.g., acrylic polymer, glass, etc.) covering openings of the windows 6 and portholes 7 to thereby prevent flow of air from the test space 5 to an exterior space such as plenum 8 (see, e.g., FIG. 1A). As discussed in more detail below, one or more imaging units 10A-10H including cameras 20A-20H, respectively, may be mounted in plenum 8. Plenum 8 may be formed between an outer barrier 9 and the sidewalls 2A, 2B, ceiling 3 and floor 4 of wind tunnel 1. The plenum 8 of some wind tunnels may be relatively small, such that there is limited space available for mounting of imaging units 10 in the plenum 8. The plenum 8 may experience low pressures and high temperatures during operation of the wind tunnel 1. The sidewalls, windows, portholes, and plenum may comprise features of existing wind tunnels. However, it will be understood that not all wind tunnels include a plenum 8, and the operating conditions in the space around the interior test space 5 of a given wind tunnel may vary depending upon the wind tunnel design. Thus, the present disclosure is not limited to any specific wind tunnel configuration or design.

Figure 2B:
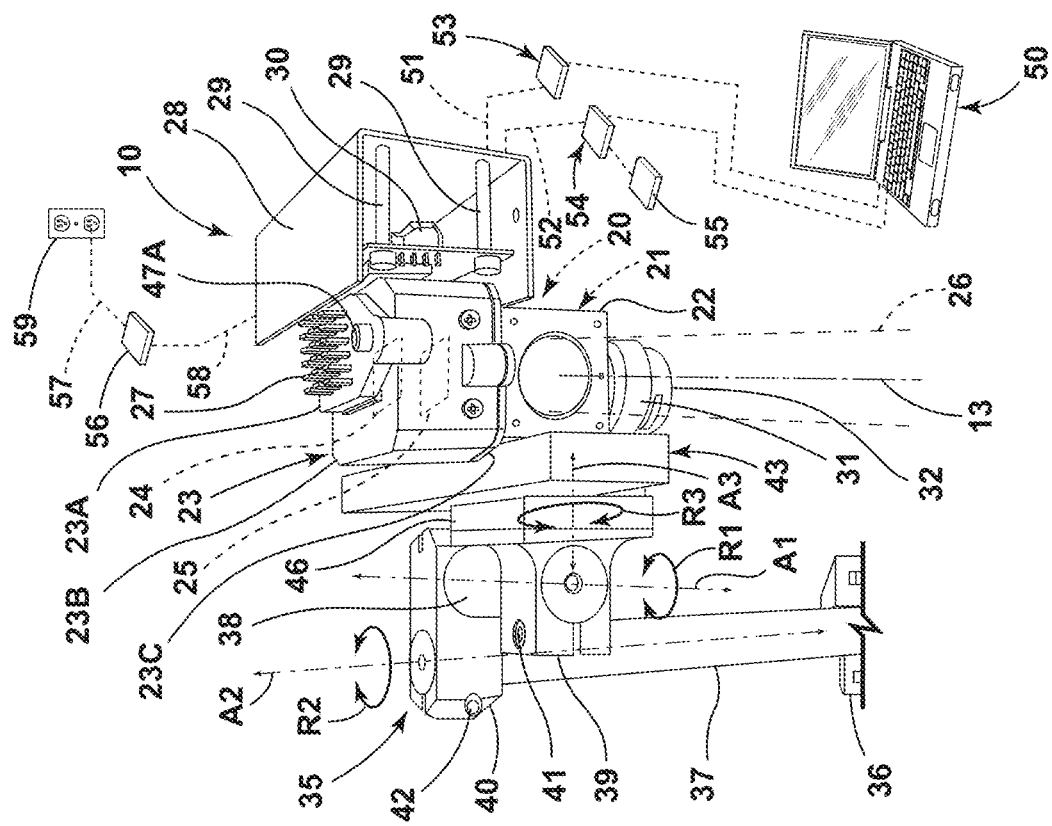
FIG. 2B is an isometric view of the imaging unit of FIG. 2A.
Figure 2A:
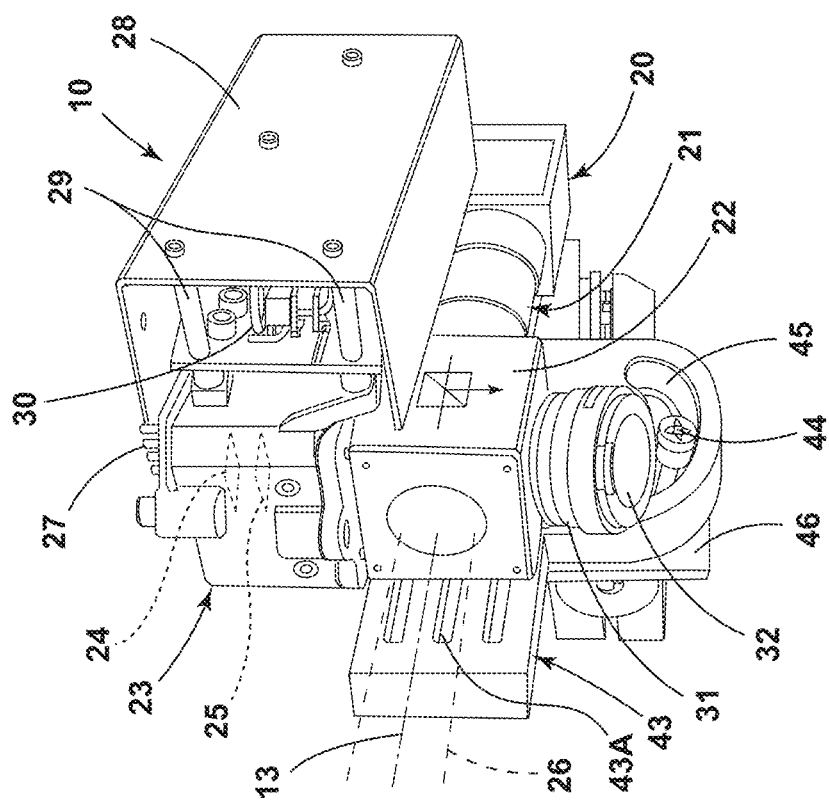
FIG. 2A is a perspective view of an imaging unit according to one aspect of the present disclosure.

Imaging units 10A-10H may be positioned in plenum 8 adjacent one or more windows and/or portholes to collect image data of gasses or other material in test space 5 during operation of wind tunnel 1. Each imaging unit 10A-10H may comprise on imaging unit 10 (FIGS. 2A, 2B). Imaging units 10A-10H may (optionally) be configured to provide a tomographic background-oriented schlieren (BOS) system defining a tomographic reconstruction region-of-interest (ROI) 15 in test space 5. The ROI 15 may be generally spherical or other shape. It will be understood that the spherical shape of an ROI is used to illustrate the general concept of an ROI, but the ROI does not necessarily have a precisely defined size or shape. As discussed below in connection with FIGS. 13-15, a single imaging unit 10 may be utilized to provide conventional 2-dimensional BOS or shadowgraph capabilities. Also, as discussed below in connection with FIGS. 16-19, one or two imaging units 10 may be used to provide tracking of a target on a wind tunnel model (photogrammetry).

Referring again to FIG. 1, in the illustrated example, the ROI 15 is offset from the centerline (CL) of interior test space 5 to accommodate an aerodynamic model 34 (see FIG. 1A) positioned on centerline CL of wind tunnel 1. However, the imaging units 10A-10H may be configured to utilize an ROI 15 at different locations within the interior space 5 as required or beneficial for a particular application. As discussed in more detail below, the imaging units 10A-10H include optical sensors such as digital (e.g., CMOS) cameras 20A-20H, respectively, having fields-of-view 12A-12H (FIG. 1B). The fields-of-view 12A-12H and corresponding optical axes 13A-13H of each camera 20A-20H are generally disposed about center 16 of ROI 15, whereby the optical axes 13A-13H are radially disposed about the center 16 of ROI 15. Fields-of-view 12A-12H may have a rectangular shape as shown in FIG. 1B. As discussed in more detail below, backgrounds, such as panels 17A-17H, may be positioned in test space 5. Panels 17A-17H may be aligned with corresponding optical axes 13A-13H, respectively. As discussed in more detail below, surfaces 18A-18H of panels 17A-17H, respectively, may comprise optical patterns that are utilized to generate BOS images. Images captured by the cameras 20A-20H of imaging units 10A-10H of panels 17A-17H, respectively, vary due to density gradients in fluid (e.g., air) flowing through ROI 15. It will be understood that variations result from effects of density gradients over the complete distance between the camera and background, and the variations captured by the imaging units 10 are not limited to a small measurement volume (e.g., spherical ROI 15). These images may be processed utilizing known BOS software to provide graphic reconstruction images corresponding to the pressure gradients of the fluid in the ROI 15 during operation of wind tunnel 1.

Figure 2C:
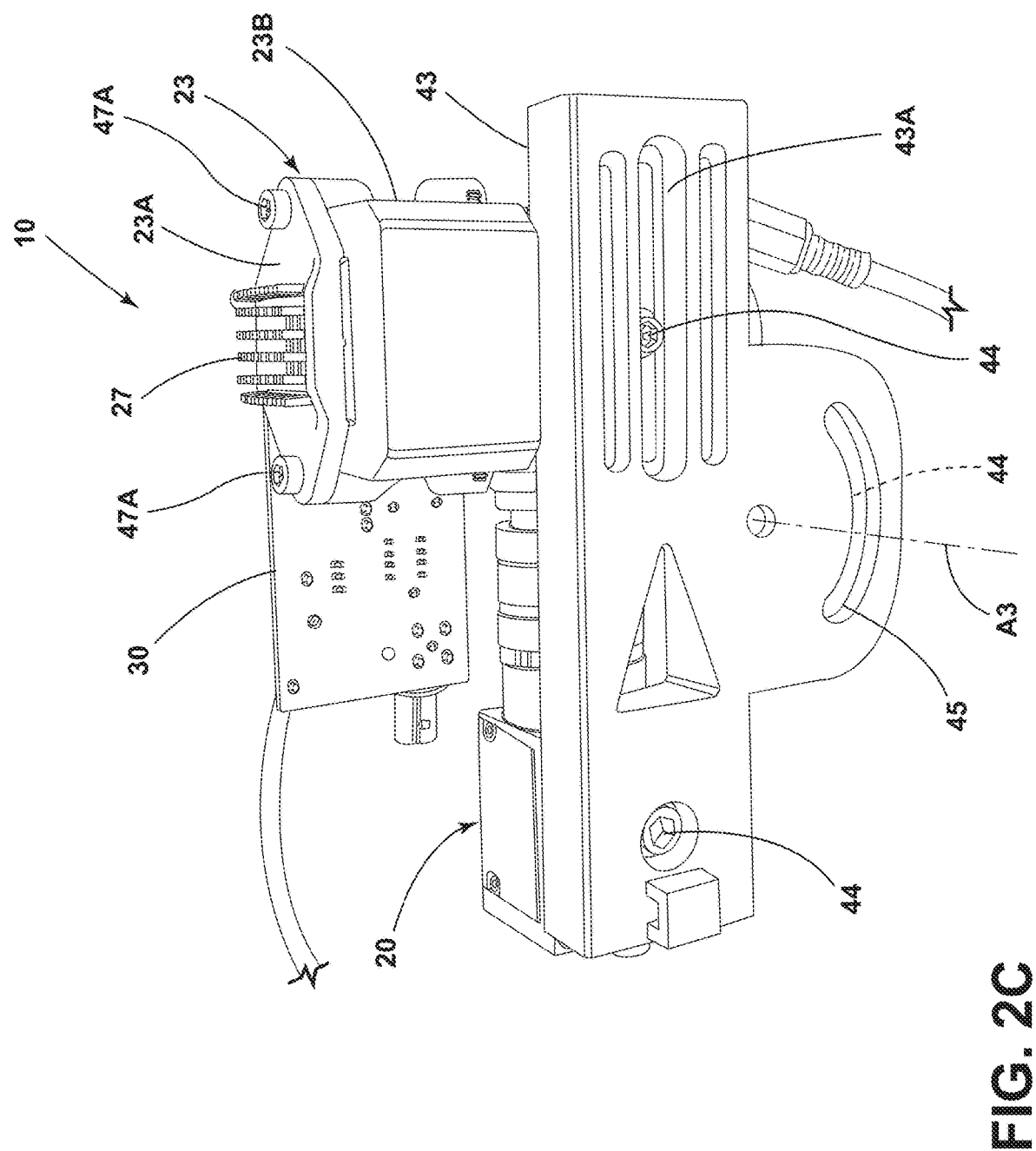
FIG. 2C is an isometric view of the imaging unit of FIG. 2A.
Figure 2E:
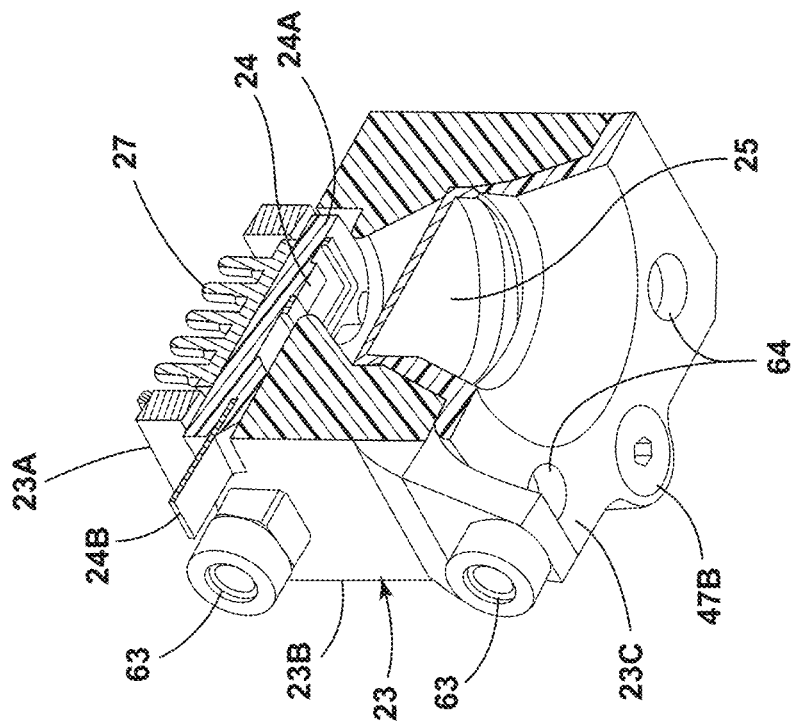
FIG. 2E is a cross sectional isometric view of a portion of the imaging unit of FIG. 2D.
Figure 2D:
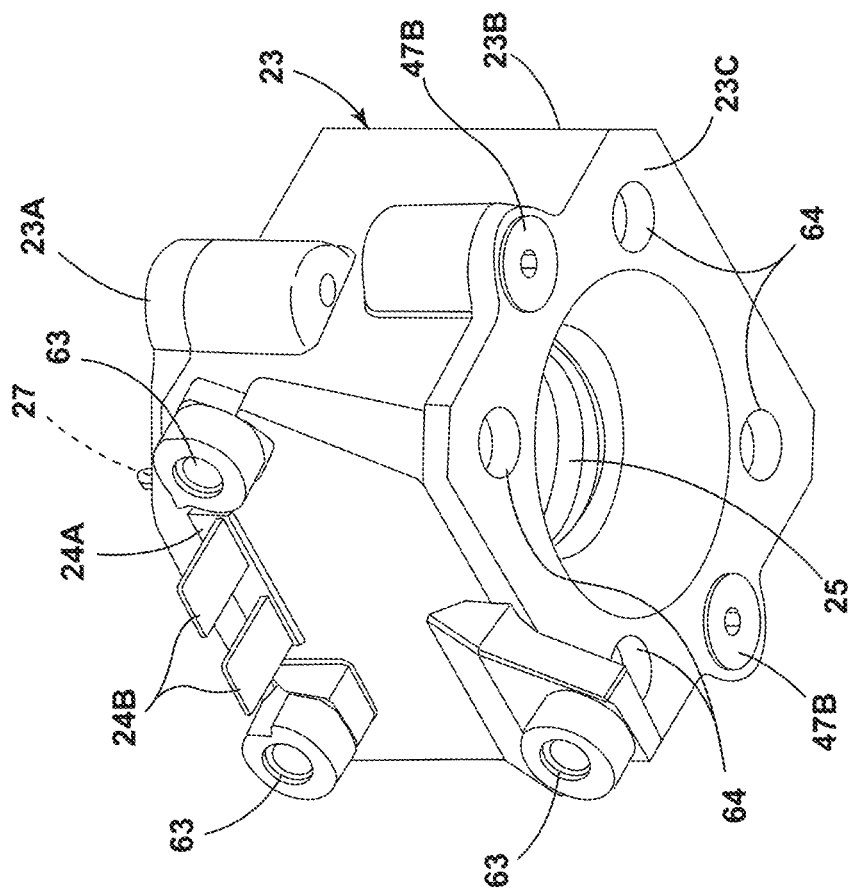
FIG. 2D is an isometric view of a portion of the imaging unit of FIG. 2A.

With reference to FIGS. 2A-2E, each imaging unit 10 may include a camera 20 (any image capturing device. In one embodiment, a Balser acA1920-40 gm, commercially available from Basler AG with a 25 mm focal length lens 21 (e.g., M118FM25, commercially available from Tamron USA, Inc. or other suitable lens). Smaller or larger focal lengths (e.g., 50 mm, or more) may be utilized as required or beneficial for a particular application. The lens 21 may be optically aligned with a beam-splitting device 22. The beam-splitting device 22 may comprise a 50/50 beam splitter cube (e.g., CCM1-BS013, commercially available from Thorlabs Inc.), beam splitting plate, or other suitable beam splitting device. A light source 24 and condenser-diffuser lens 25 are disposed inside a housing 23 above beam-splitter 22 as shown in FIGS. 2D and 2E. Support structure or housing 23 may include a first component 23A that is secured to a second component 23B by threaded fasteners 47A (FIG. 2C) to retain LED 24, Printed Circuit Board ("PCB") 24A, and heat sink 27. PCB 24A may include metal conductors 24B that are configured to electrically connect PCB 24A and LED 24 to a driver circuit 30 (FIGS. 2A-2C). Bosses/fastening features 63 threadably receive standoffs 29 (FIGS. 2A, 2B) to retain cover 28 and driver circuit 30. Housing 23 may also include a third component 23C that is secured to second component 23B by threaded fasteners 47B (FIGS. 2D and 2E). Third component 23C may be configured to retain lens 25 in optical alignment with LED 24. Openings 64 in third component 23C are configured to receive connectors (e.g., threaded fasteners) to secure housing 23 to beam splitter 22. It will be understood that support structure/housing 23 may have virtually any suitable configuration, and the present disclosure is not limited to any specific embodiment or arrangement.

Light source 24 preferably comprises one LED in accordance with a particular embodiment disclosed herein. However, a plurality of LEDs may also be utilized. As discussed in more detail below, light from light source 24 may be an LED light source and is coupled onto optical axis 13 of camera 20 to produce a beam of light 26 that is generally coaxial with optical axis 13 of camera 20 to thereby provide light for optical imaging without requiring lights that are offset from optical axis 13. In general, if a light source is offset from optical axis 13, the light may reflect from the light-transmitting material covering the windows 6 and portholes 7, which interferes with the imaging process. A condenser-diffuser lens 25 may be utilized, and comprise virtually any suitable lens. In a non-limiting embodiment, lens 25 may comprise a 1500 grit aspheric lens (e.g., Thorlabs, ACL2520U-DG15-A). Light source 24 may comprise virtually any device (e.g., an LED) that is capable of producing a high intensity pulse of light for a short period of time (e.g., CBT-120-R-C11-HK101, commercially available from Luminous Devices, Inc.). It will be understood that the present disclosure is not limited to those specific components. For example, lens 25 may comprise a fine grit diffuser and aspheric condenser lens or other suitable components. Although light source 24 may comprise an LED, any suitable light source may be utilized.

The imaging unit 10 further includes a controller, such as PCB-based LED driver circuit 30 which may be mounted to the housing 23. Imaging unit 10 may also include a protective cover 28 that is secured to the housing 23 by standoffs 29. Driver circuit 30 may be configured to account for differences in actuation lag time of camera 20 relative to LED light source 24. For example, camera 20 may have a lag time upon time receiving an actuation signal that is greater than a lag time of the LED light source 24, and driver circuit 30 may be configured to generate an actuation signal to the camera 20 before generating an actuation signal to the LED light source 24 such that the camera is actuated to generate an image during a light pulse from LED light source 24. The PCB 24A and LED light source 24 may (optionally) be directly connected to the driver circuit 30 with spade connectors to minimize the path length between the LED light source 24 and the power supply of driver circuit 30. This may facilitate over-driving LED light source 24 with high electrical current and short pulse duration as may be required in some applications. Light from the LED light source 24 is diffused by the condenser-diffuser lens 25 to minimize the appearance of patterns that may be present on the emitting surface of the LED light source 24. The condenser-diffuser lens 25 also increases the apparent size of the LED light source 24 to minimize any potential shadowgraph effects. However, it will be understood that the condenser-diffuser lens 25 is optional. The light 26 is coupled onto the optical axis 13 of the camera 20, and the light reflects off the background pattern (e.g., surfaces 18 of panels 17, FIG. 1) and straight back into the camera 20 for image acquisition. An optional angled neutral density filter 31 (e.g., Thorlabs SM1L03T) and optional flat black cap 32 (Thorlabs SM1CP2) may be used to prevent unwanted internal reflections if required or desirable.

The imaging unit 10 may form a compact rigid structure that can be adjustably connected to a base 36 by a support assembly 35. Support assembly 35 includes first and second shafts 37 and 38, and clamping brackets 39 and 40 that can be clamped to the shafts 37 and 38 by tightening threaded connectors 41 and 42. Specifically, clamping bracket 39 permits translation along axis "A1" of second shaft 38, and also permits rotation "R1" about axis A1, and second clamping bracket 40 permits longitudinal adjustment along axis "A2" and rotational adjustment "R2" about axis "A2" of first shaft 37. An adapter plate 43 (see also FIG. 2C) is fixed to the body of camera 20 and beam-splitting device 22 (e.g., secured with threaded fasteners 47), and the adapter plate 43 is secured to clamp bracket 39. The adapter plate 43 includes an arcuate slot 45 that receives a threaded fastener 44 that threadably engages a plate 46 that is fixed to clamp 39. Threaded fastener 44 can be loosened, and the imaging unit 10 can be rotated about an axis "A3" as shown by the arrow "R3." The support assembly 35 permits the imaging unit 10 to be mounted in a confined space, such as plenum 8 (FIG. 1A), and permits adjustment of the position and angle of imaging unit 10 and camera 20 to permit the optical axis 13 to extend through a window or port of a wind tunnel 1 (FIG. 1). Clamping brackets 39 and 40 may comprise commercially available components.

In the depicted embodiment, to enable focus adjustments of the lens, the screw for the beam splitter device (e.g., cube 22) is loosened and slides along a slot 43A (FIGS. 2A, 2C) as the focus ring is adjusted. To lock the focus in place, both the focus ring setscrew and the beam-splitter cube screw are tightened.

Each camera 20 may have two connections, namely, an Ethernet cable 51 (FIG. 2B) and a trigger cable 52. The Ethernet cable 51 connects to a network switch 53, which is connected to a computing device, such as a laptop computer 50, for data acquisition. It will be understood that network switch 53 is not required if the system does not include multiple cameras 20 configured to operate simultaneously. For example, if only one camera 20 is being used, it can be connected directly to an Ethernet card on a computer. Additionally, a USB-based camera 20 can be used with connections to USB ports on a computer or to a USB hub if multiple cameras 20 are being used.

Commercially available software (e.g., Basler Pylon Viewer) may be used to acquire data synchronously for all cameras 20 in the system. Trigger cables 52 from each camera 20 are connected to a trigger/power board 54, which acts as a central hub for all triggering signals. A function generator 55 is also connected to the trigger board 54, as well as to a BNC trigger input for the driver circuit 30. Function generator 55 triggers the LED light sources 24, controls the pulse duration of the LED light sources 24 and controls the phase delay between the camera trigger and the LED trigger. As noted above, a delay between the LED and camera trigger may be required if there is an inherent delay in the camera exposure start time after receiving a trigger (actuation signal) whereas the response of the LED light source 24 may be substantially instantaneous. A single trigger coaxial cable from function generator 55 may be connected to a first camera of a system (e.g., FIG. 1), and the other cameras may be connected to each other with coaxial cables using BNC T connectors. According to a non-limiting embodiment, a 12-volt DC power supply 56 may include a 120-volt input line 57 and a 12-volt line 58 that is operably connected to the camera 20 and LED light source 24 to provide power from a conventional 120-volt outlet 59. However, virtually any suitable power supply may be utilized. Also, it will be understood that multiple imaging units 10 may be interconnected to a single trigger board 54 and computer 50 utilizing cables 51 and 52 or other suitable arrangement.

Figure 1A:
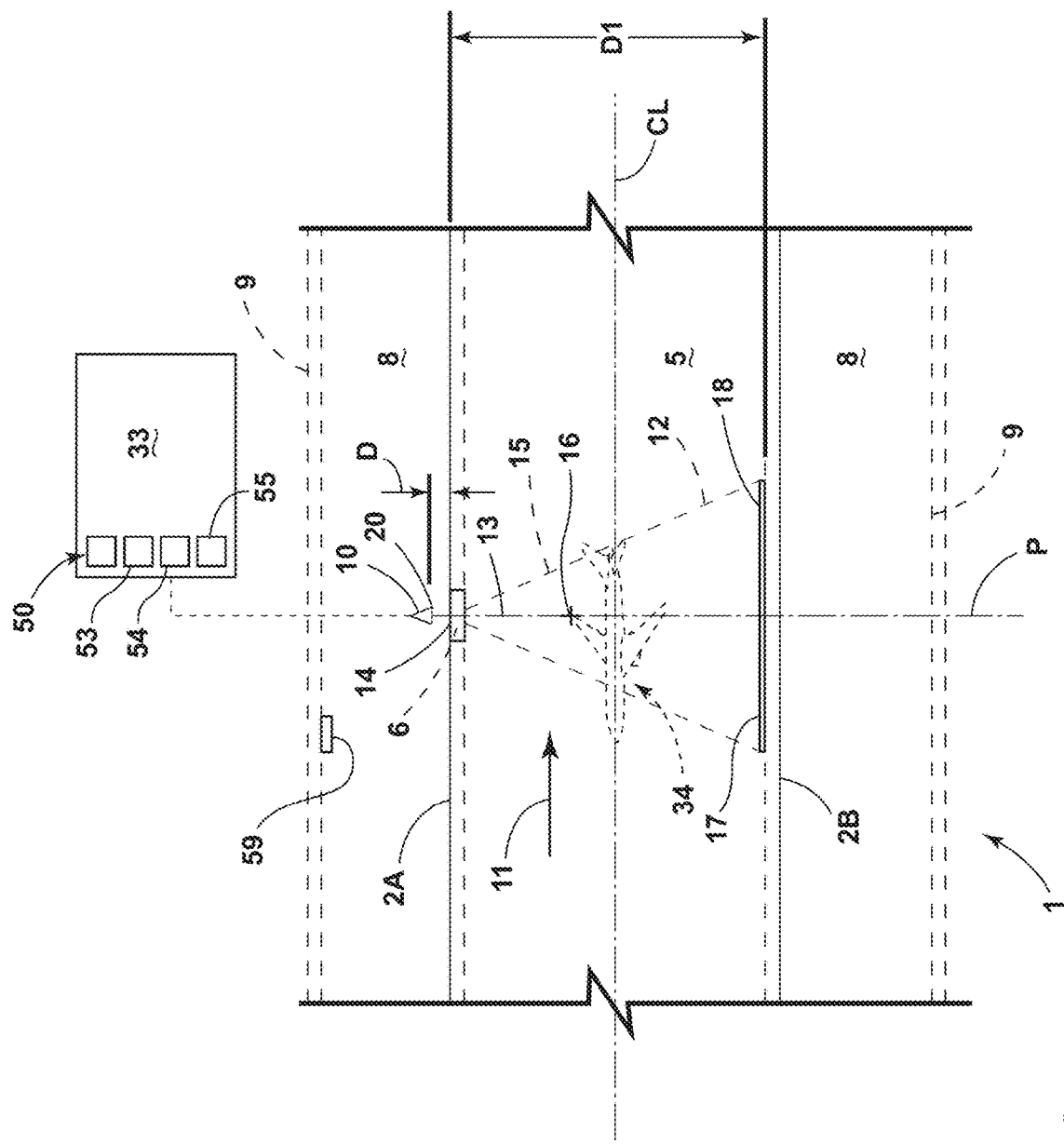
FIG. 1A is a fragmentary, schematic top plan view of the wind tunnel of FIG. 1.

The imaging units 10 (FIGS. 2A and 2B) can be positioned in a plenum 8 (FIG. 1A) with the axis 13 of each imaging unit 10 aligned with a window 6 or porthole 7 about the tomographic region of interest (ROI) 15. As shown in FIG. 1, the ROI 15 may be offset from centerline CL of interior test space 5 of wind tunnel 1. However, the imaging units 10 may be arranged to provide an ROI 15 at different locations within the interior test space 5 of wind tunnel 1 as required for a particular application. As shown in FIG. 1, the imaging units 10A-10H may be arranged around approximately one-half (½) of the tunnel circumference (i.e., approximately 180 degrees coverage). However, the imaging units 10 may be positioned at different locations as required for a particular application. Also, the number of imaging units 10 may also vary as required for a particular application. Although eight imaging units 10A-10H are shown, fewer imaging units 10 could be utilized (e.g., 4 or 5), or the number of imaging units 10 could be greater. In the illustrated example, the imaging units 10A-10H are generally positioned with the optical axes 13 of imaging units 10A-10H arranged in a plane "P" (FIG. 1A). However, the imaging units 10 could be positioned such that the optical axes 13 are positioned in two or more planes.

The imaging units 10 may be configured to provide low-speed acquisition (on the order of a few Hz), if time resolution is not a priority. The imaging units 10 are preferably configured to be able to withstand low pressures and high temperatures in plenum 8 during pump-down and operation of wind tunnel 1. The imaging units 10 may be configured to provide short exposure to "freeze" fluid flow up to Mach 1.4 or higher Mach numbers (e.g., Mach 6-10). A controller, such as driver circuit 30 (FIGS. 2A and 2B), may be configured to synchronously (or substantially synchronously) trigger all cameras 20A-20H remotely from a control room 33 (FIG. 1A). The driver circuit 30 may be configured to maximize LED output intensity and minimize pulse width. Also, the on-axis lighting (i.e., beam of light 26) maximizes intensity return from surfaces 18A-18H of background panels 17A-17H, respectively. The optical axes 13 of the imaging units 8-10 are preferably at least about 10 degrees from perpendicular of the transparent material of windows 6 and portholes 7 to prevent light from reflecting directly back into the cameras 20. The angle required to avoid reflection may vary somewhat depending on the distance "D" (FIG. 1A) of the camera 20 from the surface 14 of the transparent material of side windows 6 and portholes 7. In general, if the distance "D" is relatively small, the angle of the optical axis 13 relative to perpendicular of surface 14 must be larger. However, the angle from perpendicular can be smaller if the distance "D" is larger. In the non-limiting embodiment of FIG. 1, the approximate angle of the imaging units 10 relative to the window perpendiculars is 11.1 degrees for imaging units 10A and 10H, 31.5 degrees for imaging units 10B and 10G, 46.3 degrees for imaging units 10C and 10F, and 28.0 degrees for imaging units 10D and 10E. These angles may result from positioning the imaging units 10A-10H radially about ROI 15, with the axes 13A-13H of imaging units 10A-10H, respectively, generally passing through center 16 of ROI 15.

During operation of wind tunnel 1, air or other fluid 11 flows through interior test space 5 around a model 34 (FIG. 1A). Model 34 may comprise, for example, a scale model of an aircraft that is positioned on centerline CL of interior test space 5. In the illustrated example, the ROI 15 is offset from centerline CL to provide imaging of flow around a side portion of model 34. As noted above, the axes 13A-13H of imaging units 10A-10H, respectively, may be coplanar and lie in a plane "P" (FIG. 1A). However, one or more of the imaging units 10 may be positioned fore or aft of plane "P" if required for a particular application. As discussed in more detail below, small retro-reflective targets (i.e., small dots) may be placed on the model 34 and the imaging system may be used to track the position of these dots for photogrammetry purposes.

Surfaces 18A-18H of background panels 17A-17H, respectfully, may include a uniform density and distribution of retroreflective background dot patterns based on the field of view 15 of the cameras 20 of imaging units 10, and the distance "Dl" (FIG. 1A) of the cameras 20 from the background 17. The dot pattern may be printed or otherwise formed directly on the background material 17, and the background panels 17 may preferably comprise a material that is suitable for attaching the walls to ceiling 3 and floor 4 of wind tunnel 1 and remain attached during operations at, for example, supersonic Mach numbers. The surfaces 18 of the backgrounds 17 are preferably configured to provide a high intensity light return. For example, the surfaces 18 may comprise high gain reflective sheeting. It will be understood that this is merely an example of one suitable material, and other materials may be utilized for the surfaces 18A-18H.

According to a non-limiting embodiment, a dot pattern was formed on surfaces 18A-18H by spraying flat-black spray paint onto the surface. In particular, the nozzle of the spray paint can was enlarged from its original diameter, the background panels 17A-17H were placed on the floor, and the can was held upright with the nozzle depressed slightly until a stream of paint particles were ejected and fell onto the background material. This combination of an enlarged nozzle diameter and the light nozzle pressure resulted in generally repeated background patterns with some variation in dot size and distribution period. In the illustrated example, the sprayed backgrounds were then applied to flat panels, utilizing the adhesive backing of the high gain reflective shielding, which panels were cut to the appropriate size for each background 17A-17H. It will be understood that this is merely one example of suitable background configuration, and a wide range of backgrounds may be utilized.

Prior to use, the imaging units 10 may be calibrated utilizing a calibration plate (not shown). Calibration of BOS systems is generally known, and a detailed description of the calibration process is, therefore, not believed to be required. In use, as fluid 11 flows through the interior test space 5, the imaging units 10 are actuated to capture images, and the images can be processed utilizing known software to provide tomographic reconstruction. An example of software that may be utilized to process the image data from the imaging units 10 is DaVis Version 10.0.5 (or 10.1.1) software commercially available from LaVision of Ypsilanti, Mich. It will be understood that virtually any suitable program may be utilized.

Figure 3:
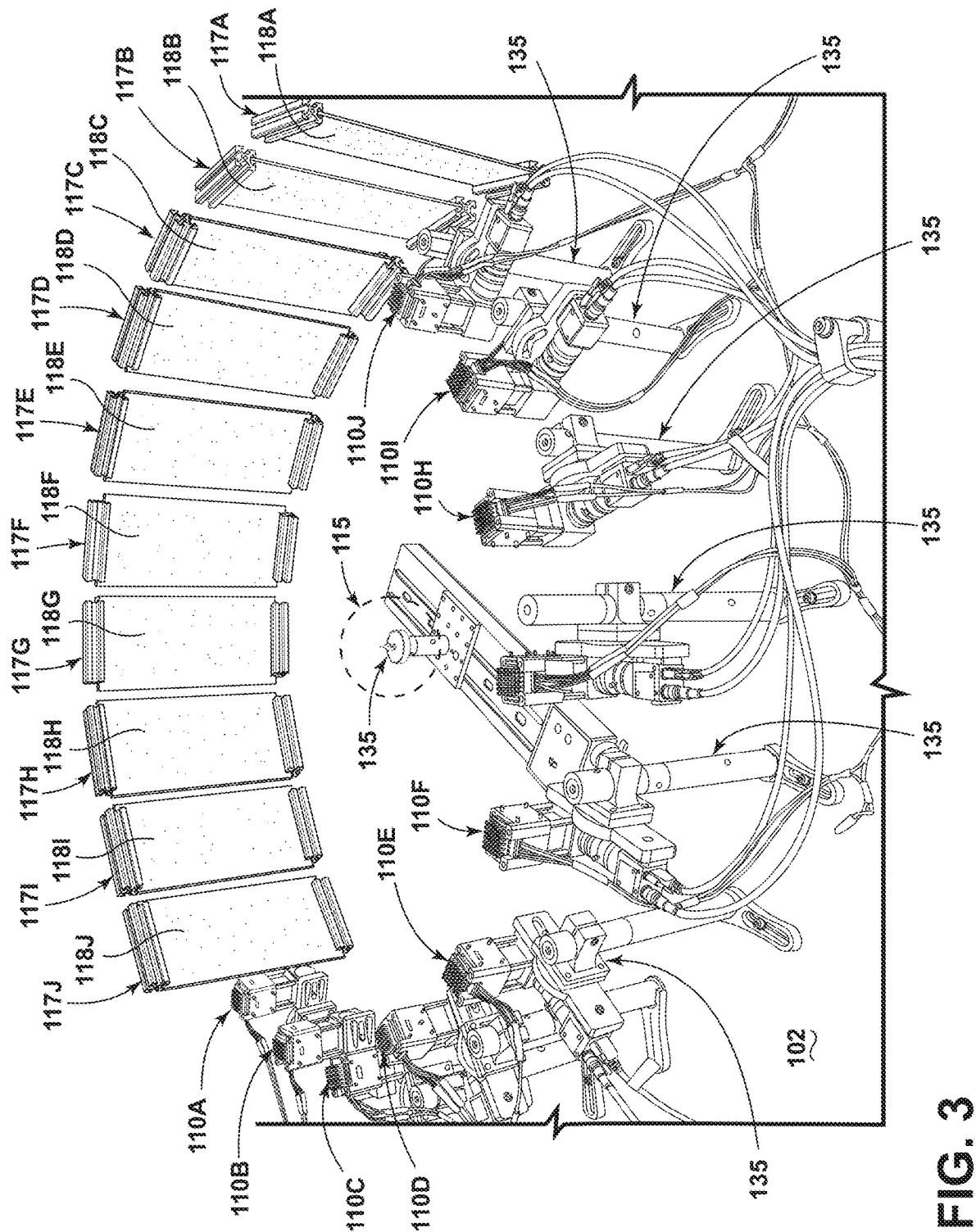
FIG. 3 is a partially fragmentary isometric view of a plurality of imaging units in a test configuration.
Figure 4:
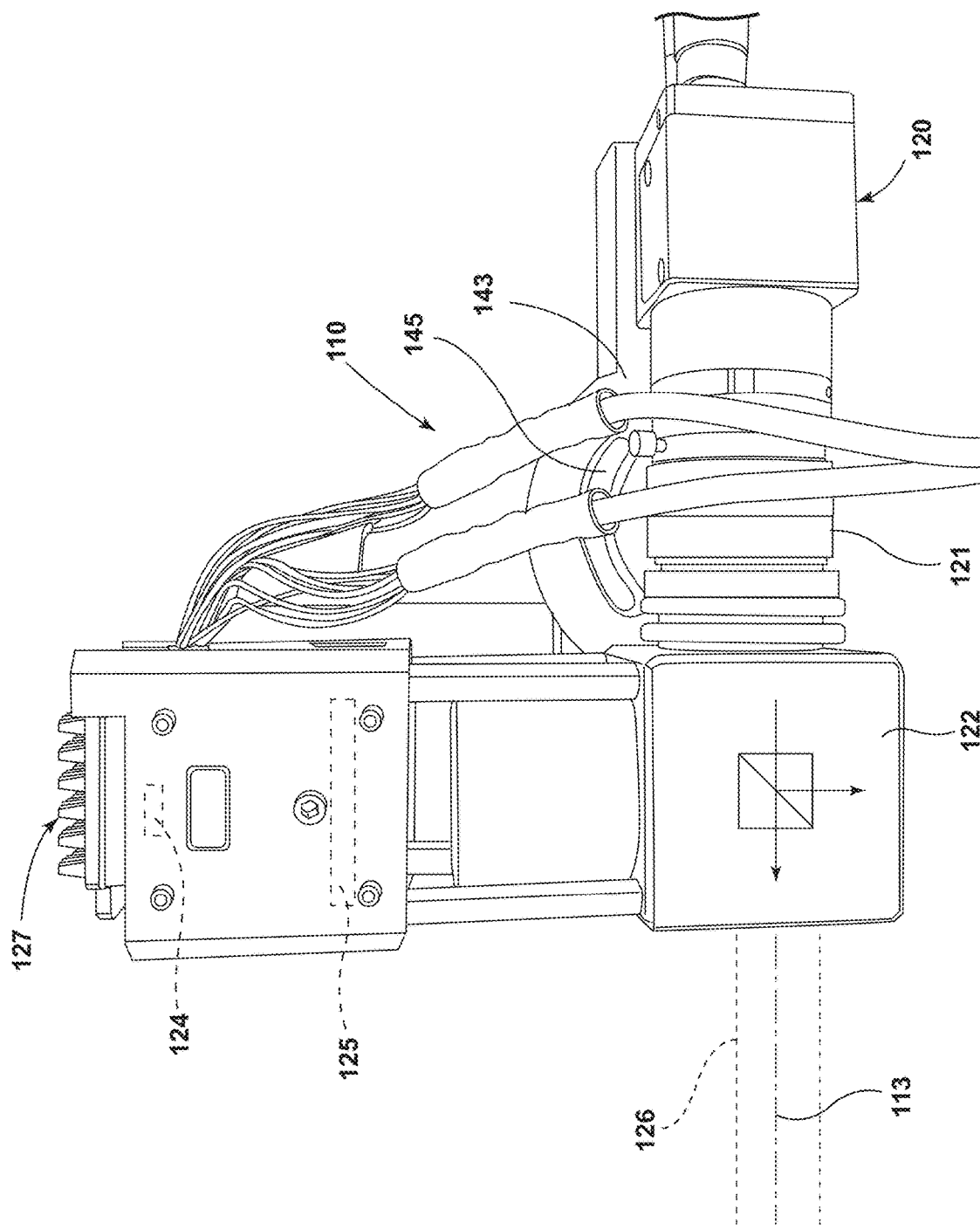
FIG. 4 is a partially fragmentary isometric view of an imaging unit.
Figure 5:
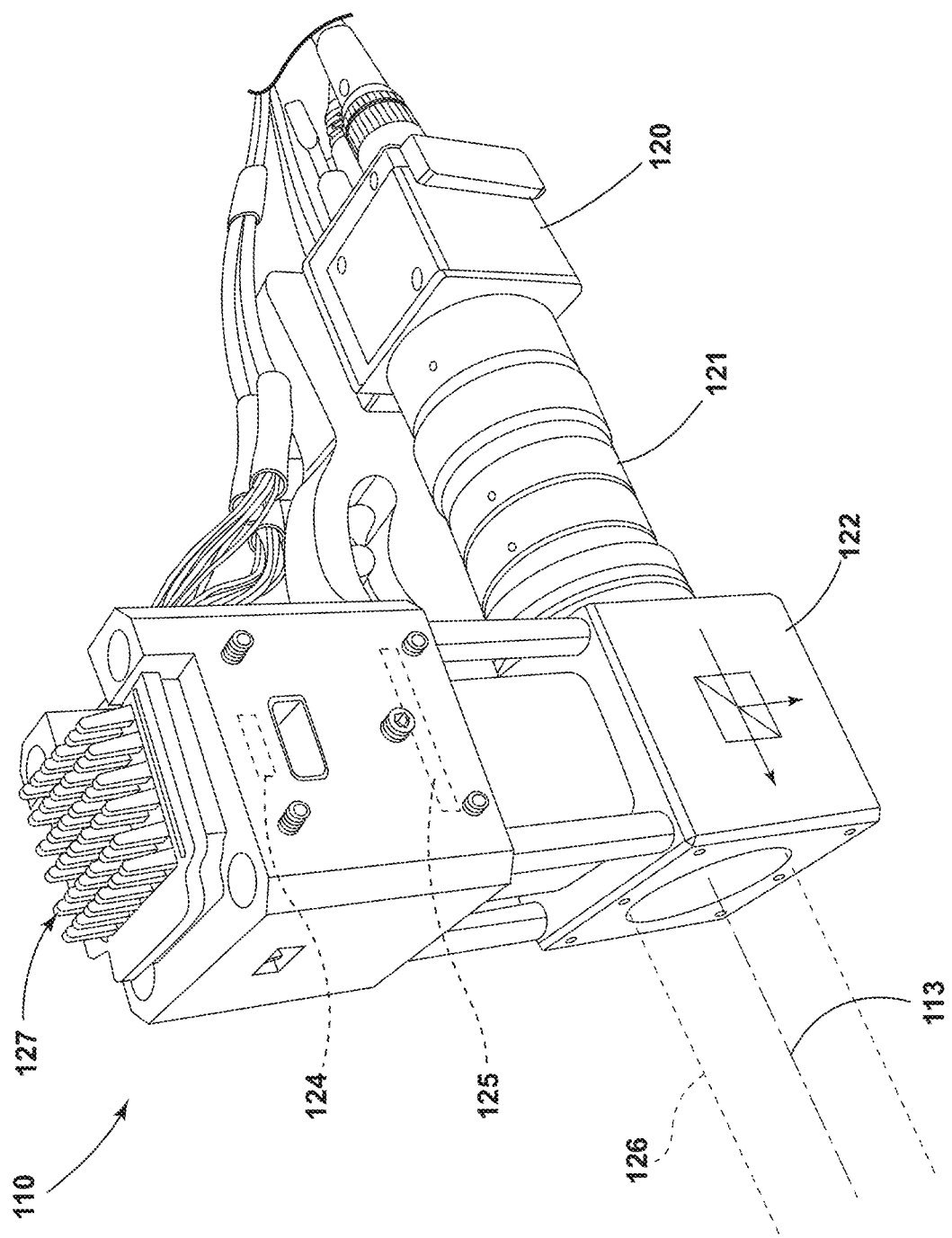
FIG. 5 is a partially fragmentary isometric view of an imaging unit.
Figure 6:
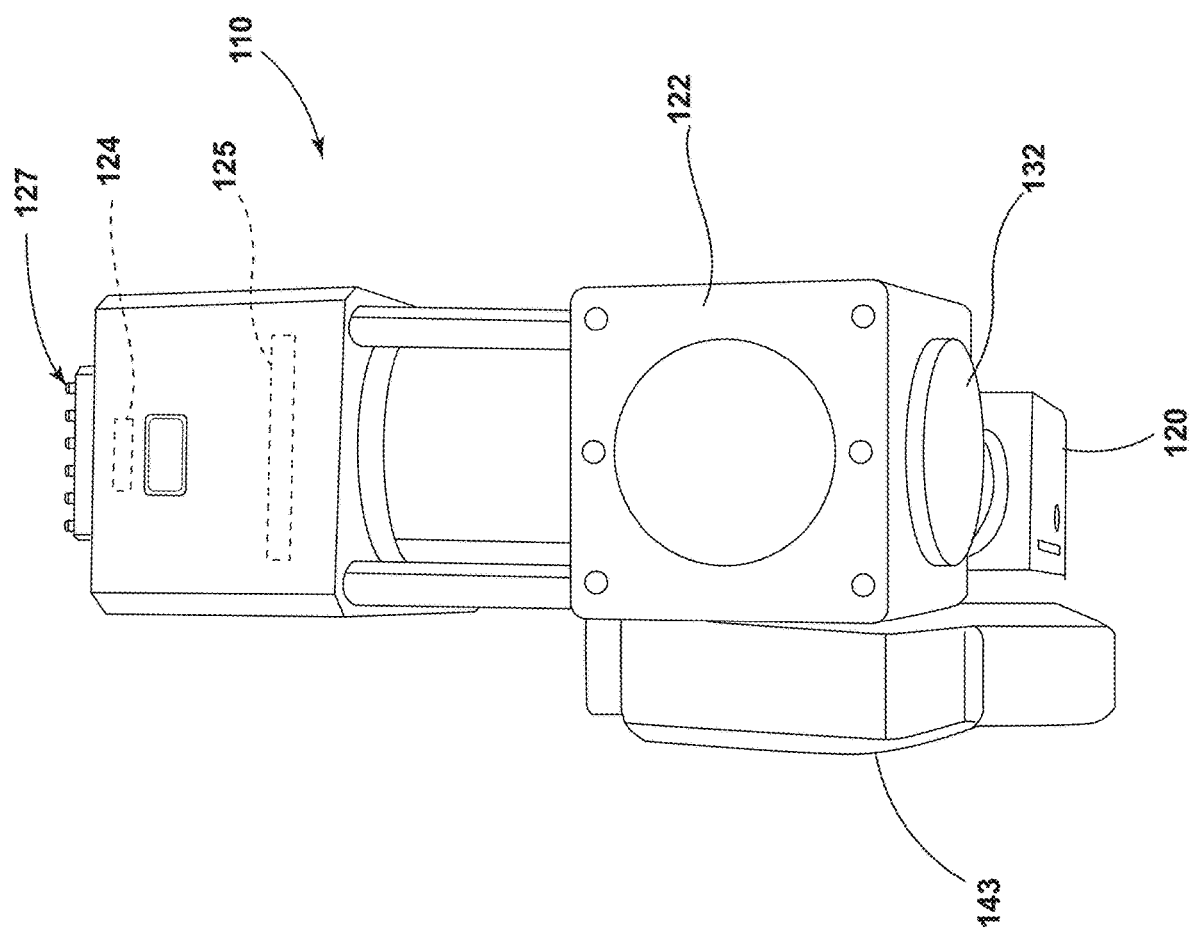
FIG. 6 is a partially fragmentary isometric view of an imaging unit.

With further reference to FIG. 3, an imaging system 100 according to another aspect of the present disclosure includes imaging units 110A-110J disposed about a tomographic region of interest ROI 115. Imaging system 100 comprises a test system with the imaging units 110A-110J mounted to a test table 102. The imaging units 110A-110J operate in substantially the same manner as the imaging units 10A-10H, described in more detail above, and include support assemblies 135 that adjustably support the imaging units 110A-110J on test table 102. The imaging units 110A-110J are mounted radially about ROI 115 with the optical axis of imaging units 110A-110J being aligned with backgrounds 117A-117J. Surfaces 118A-118J of backgrounds 117A-117J, respectively, may comprise reflective surfaces with dots or other suitable patterns. A candle 135 is positioned in ROI 115 to generate pressure gradients for test purposes.

Figure 7:
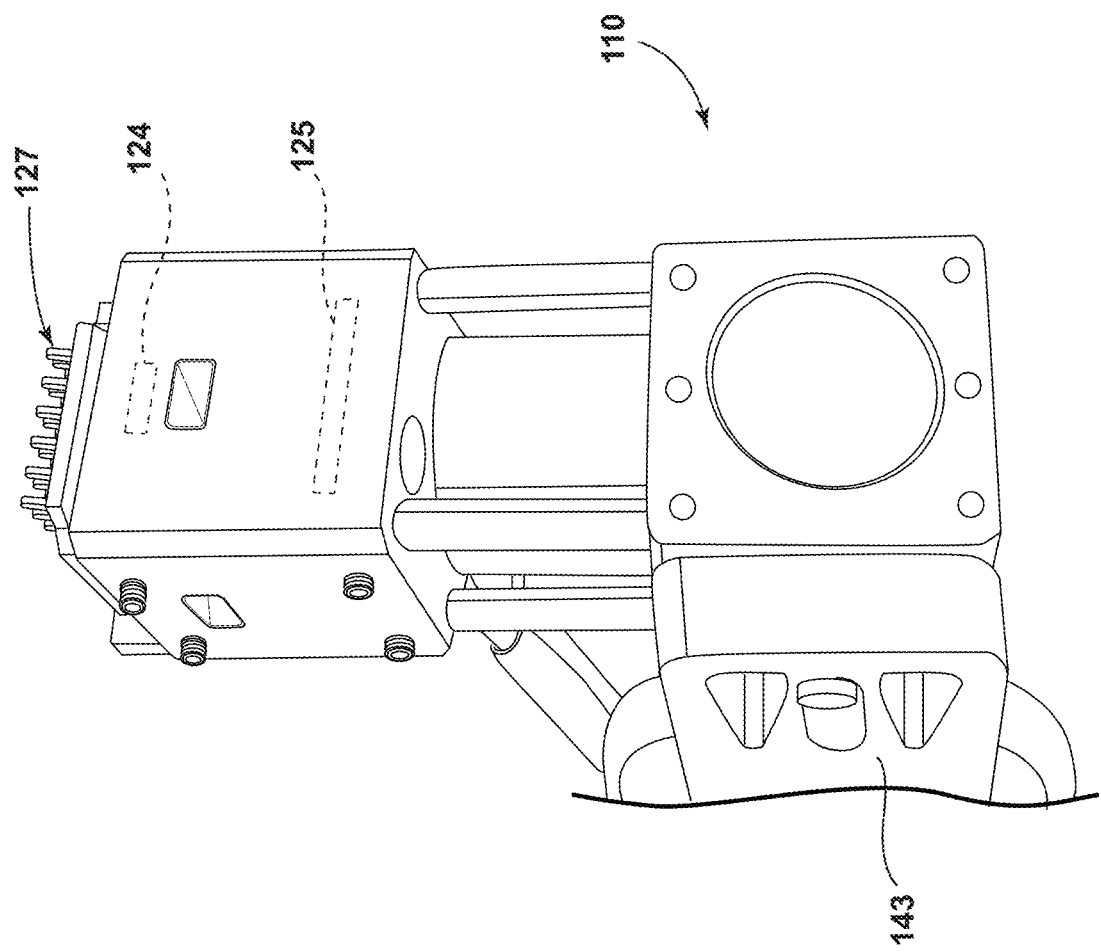
FIG. 7 is a partially fragmentary isometric view of an imaging unit.

With reference to FIGS. 4-7, imaging units 110 include a digital camera 120, which may be substantially similar to the camera 20 described in more detail above. An LED light source 124 produces light that is coupled onto optical axis 113 by a beam-splitting device 122 after passing through an aspheric condensing lens with a diffuser 125, which may be similar to the condenser aspheric lens 25 with diffuser shown in FIG. 2D. The light forms a beam 126 that is coaxial with optical axis 113 of camera 120. An optional heat sink 127 provides the coupling of the LED light source 124. Adapter plate 143 is an arcuate slot 145 that provides for rotational adjustment of imaging unit 110 in substantially the same manner as discussed in more detail above in connection with the imaging units 10. The imaging unit 110 may optionally include a blackened cap 132 (FIG. 6) to prevent light from escaping beam splitter 122. A neutral density filter may be utilized instead of blackened cap 132. With reference to FIG. 7, the imaging unit 110 may, optionally include an angled neutral density filter as an alternative to the cap 132.

Figure 8:
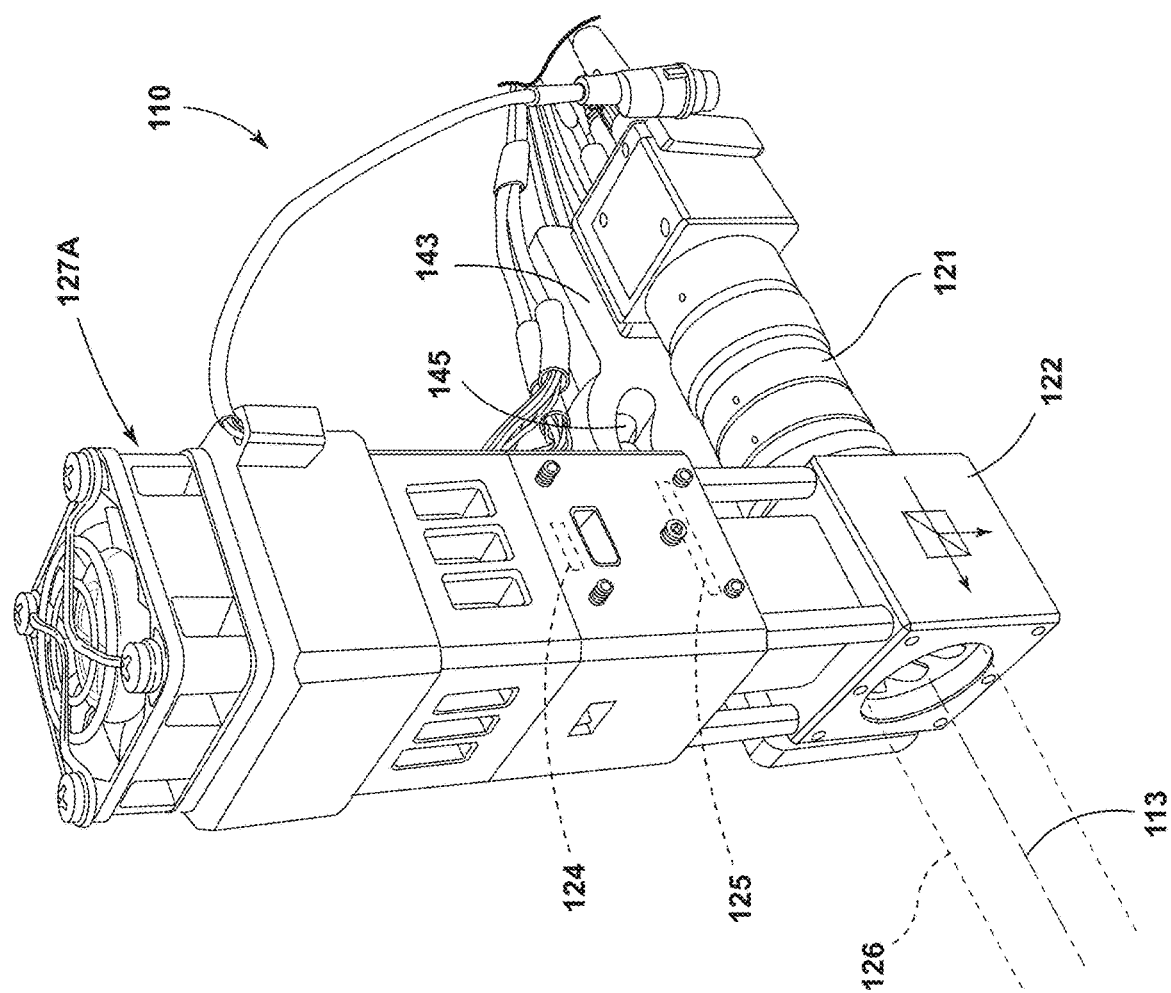
FIG. 8 is a partially fragmentary isometric view of an imaging unit.

With further reference to FIG. 8, a cooling fan 127A may be utilized to cool LED light source 124 as an alternative to the heat sink 127.

Figure 9:
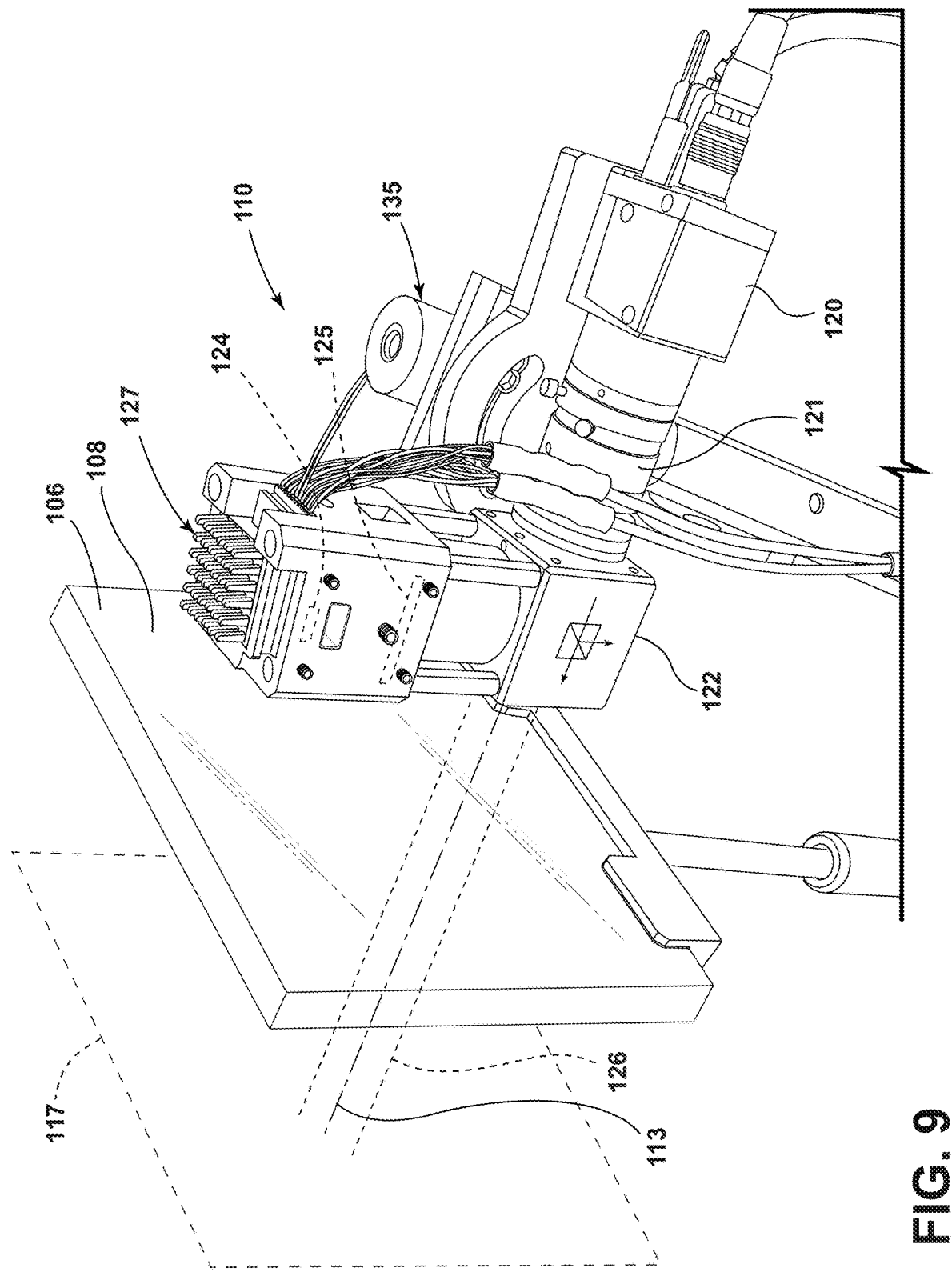
FIG. 9 is a partially fragmentary isometric view of an imaging unit with an acrylic window positioned in front of the imaging unit.
Figure 10:
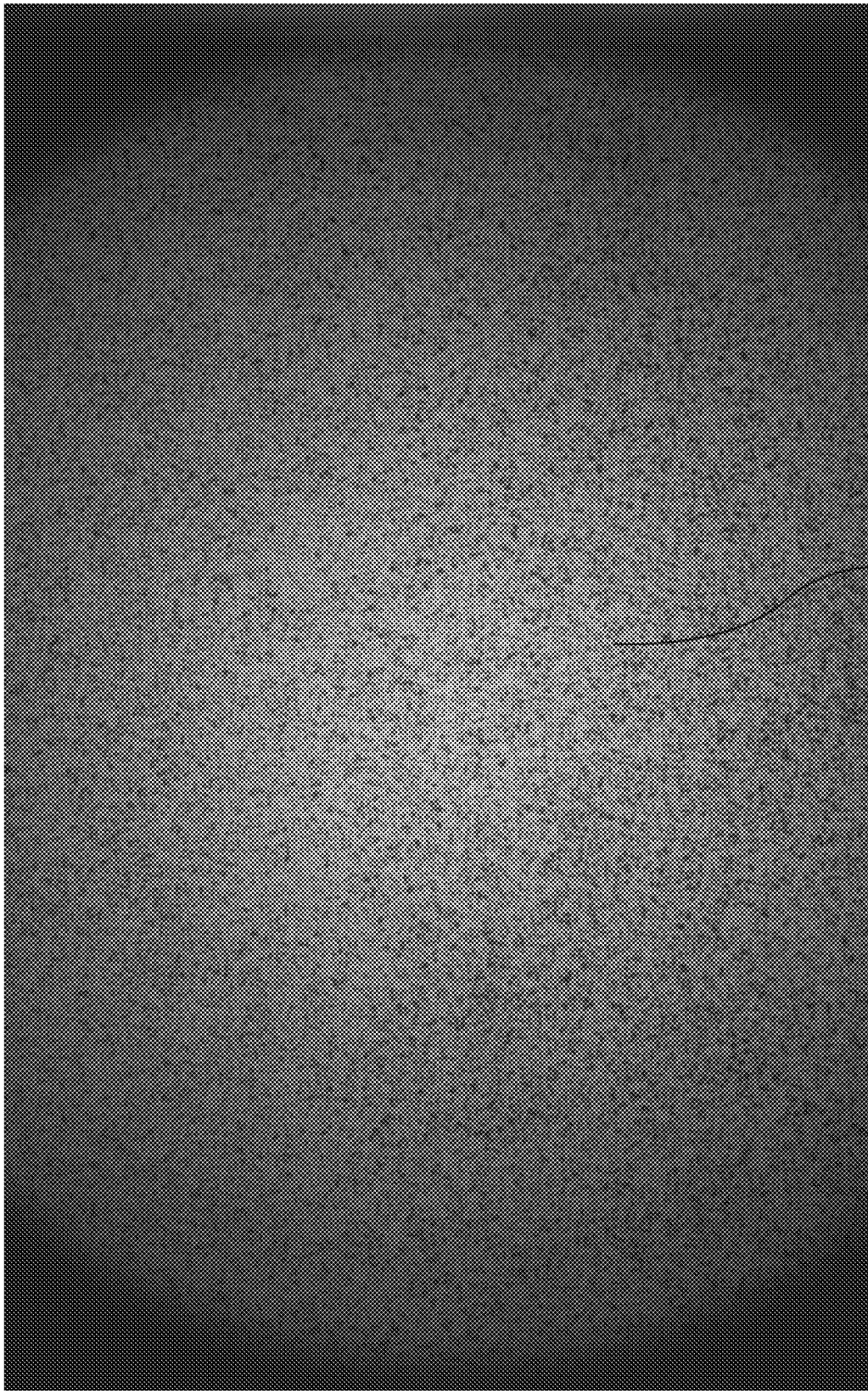
FIG. 10 is a resulting image with the acrylic window of FIG. 9 in place.
Figure 11:
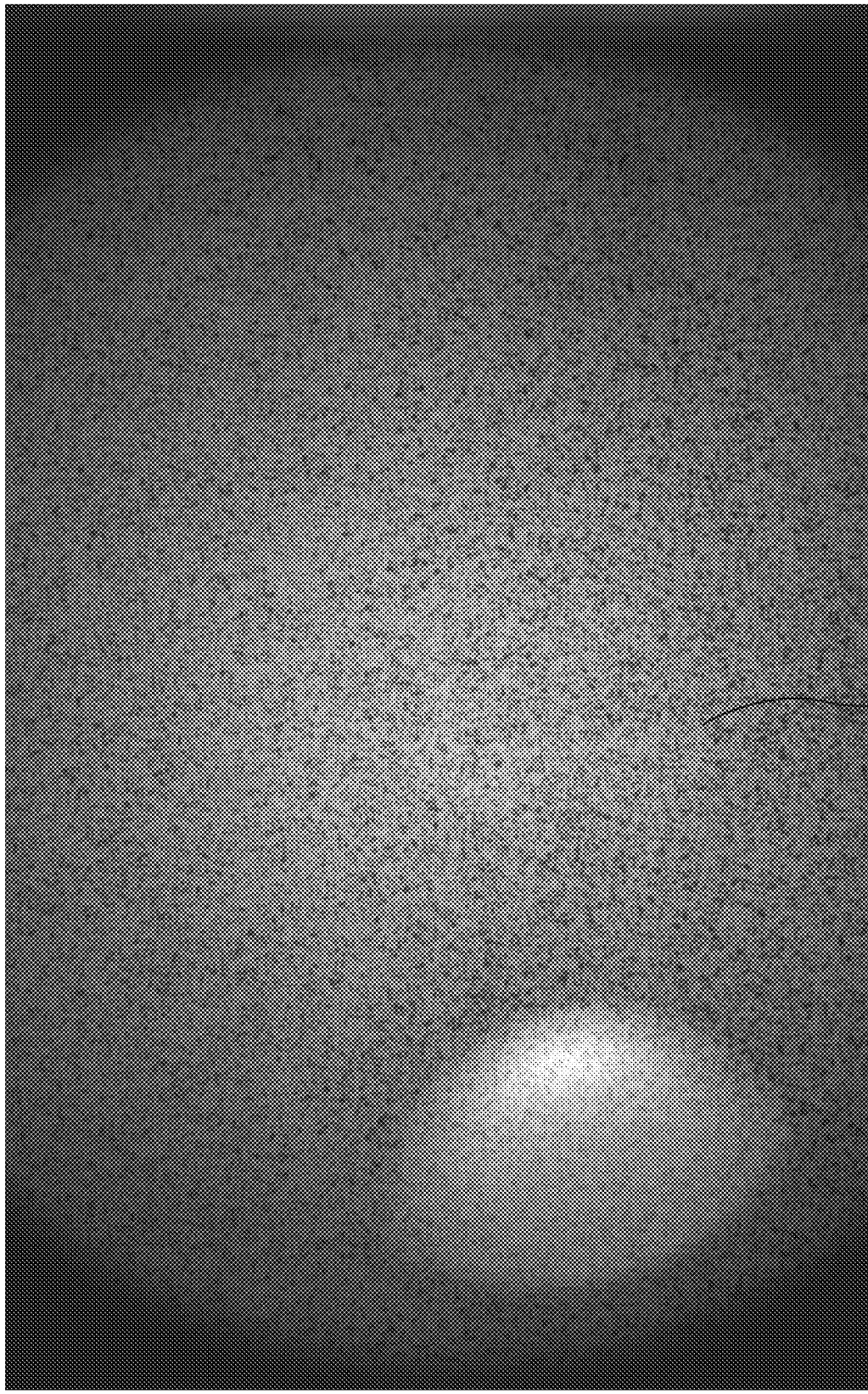
FIG. 11 is a resulting image with the acrylic window of FIG. 9 in place when the camera horizontal angle is 0 and the pitch angle is approximately 8 degrees.
Figure 12:
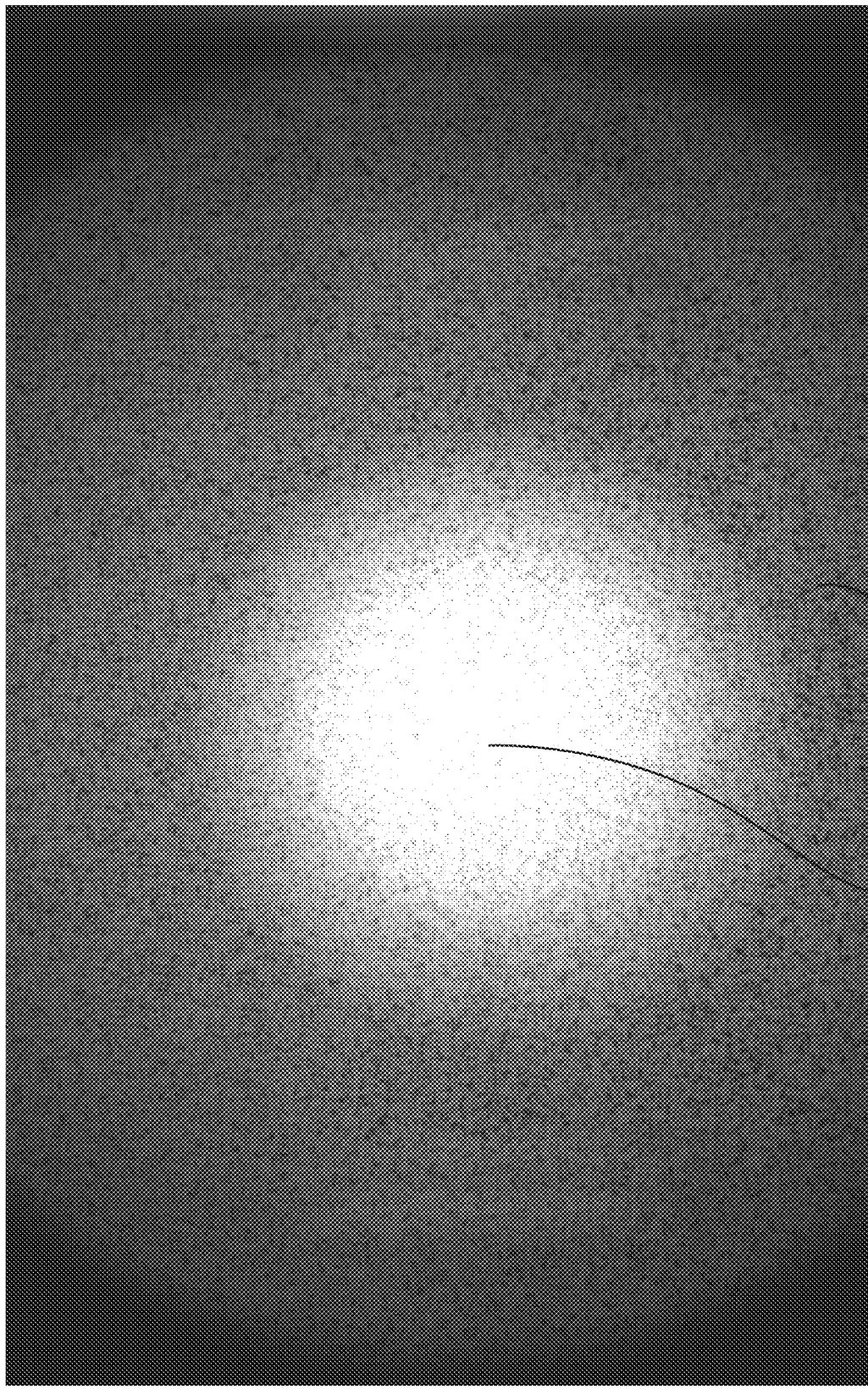
FIG. 12 is a resulting image with the acrylic window of FIG. 9 in place when the camera is aligned approximately normal to the surface of the acrylic window of FIG. 9.

With further reference to FIG. 9, an imaging unit 110 (or imaging unit 10) may be positioned with optical axis 113 passing through a sheet 106 of transparent material. Optical axis 113 of imaging unit 110 may be positioned at an angle relative to a normal direction of surface 108 of transparent sheet 106. As discussed above, the angle prevents reflected light (i.e., from beam of light 126) from reflecting directly back into camera 120. FIG. 9 shows a test configuration that may be utilized to determine an amount of light reflected from surface 108 of sheet 106 into camera 120 (or 20). The sheet 106 may comprise, for example, an acrylic polymer material that is about 0.5 inches thick. FIGS. 10-12 comprise images taken utilizing camera 120 adjacent acrylic sheet 106 with a background pattern 117 opposite the acrylic sheet 106. FIG. 10 is an image 150A taken with a horizontal angle of approximately 14 degrees and a pitch angle of approximately 8 degrees relative to a normal direction of surface 108 of sheet 106. FIG. 11 comprises an image 150B resulting from a horizontal camera angle of approximately 0 degrees and a pitch angle of approximately 8 degrees, and FIG. 12 is an image 150C resulting from optical axis 113 being parallel to a normal direction of surface 108 of sheet 106. In general, the optical axis 113 of camera 120 is preferably at an angle of at least about 8 degrees relative to a normal direction of surface 108 to prevent reflection of light from surface 108 directly back into camera 120, which may form a bright spot 152, as shown in FIG. 12.

Figure 12A:
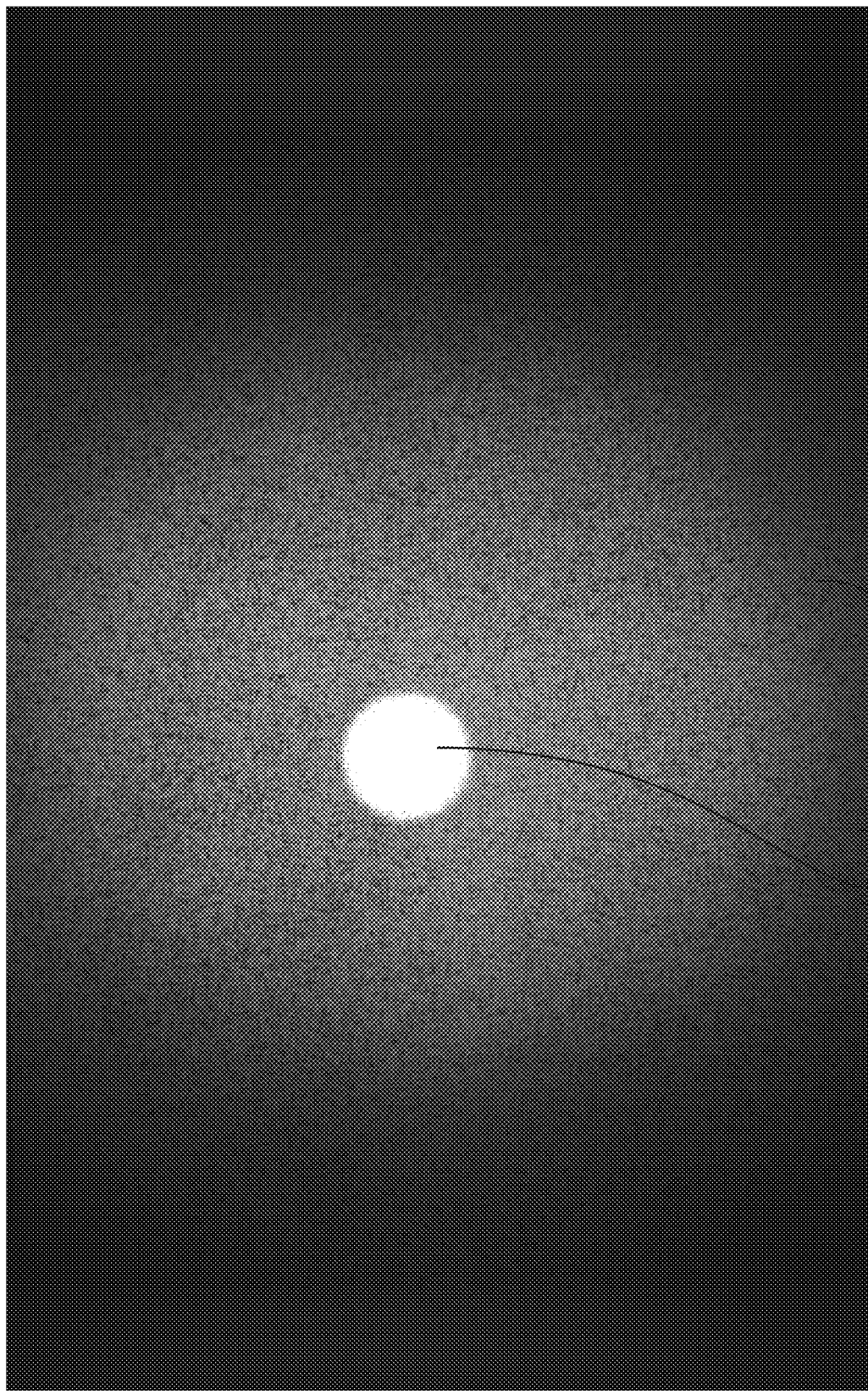
FIG. 12A is an image taken with a camera wherein the optical axis is oriented at 0 degrees incidence relative to an acrylic sheet.
Figure 12B:
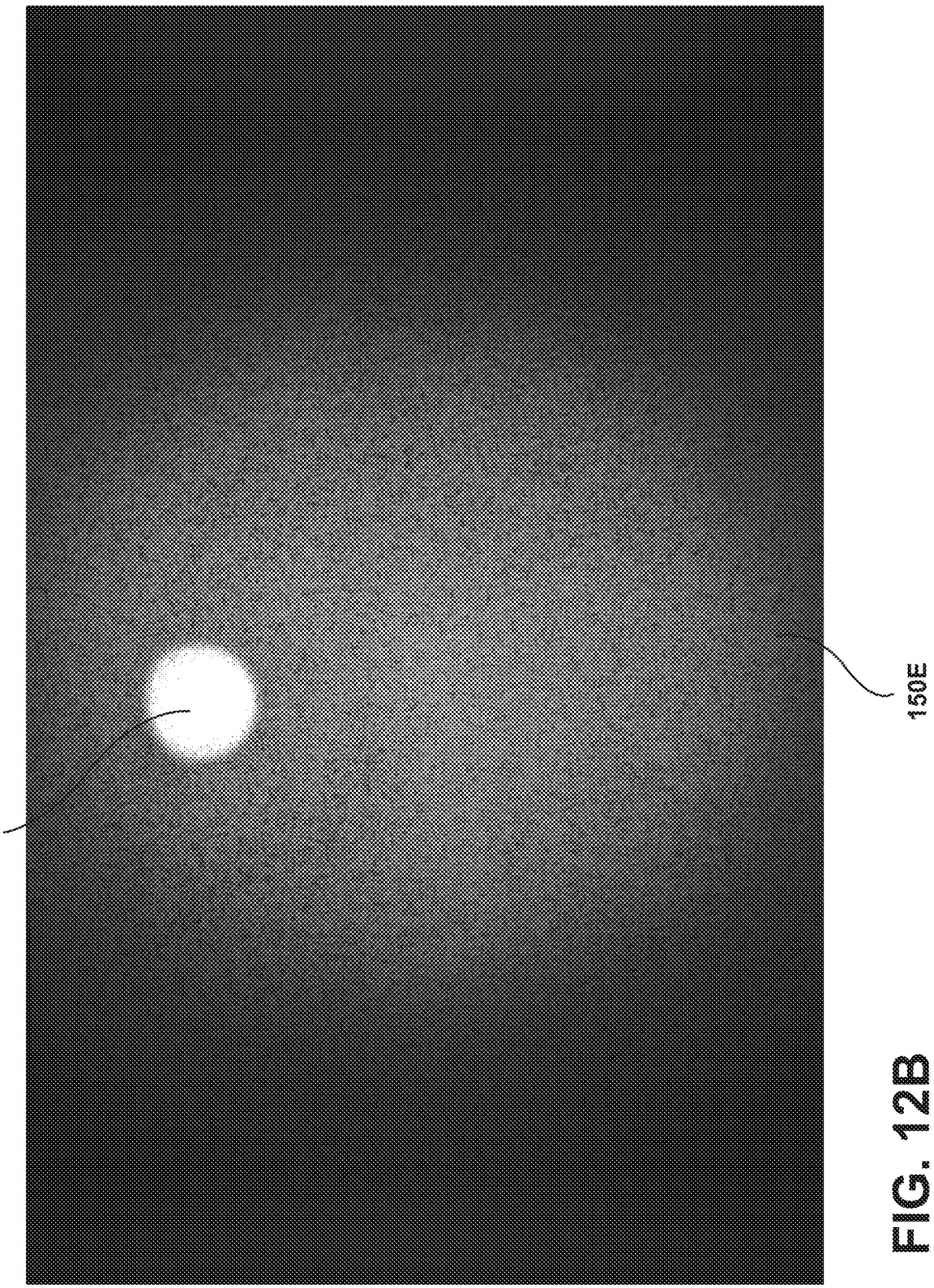
FIG. 12B is an image taken with a camera wherein the optical axis is oriented at 4 degrees off normal incidence relative to an acrylic sheet.
Figure 12C:
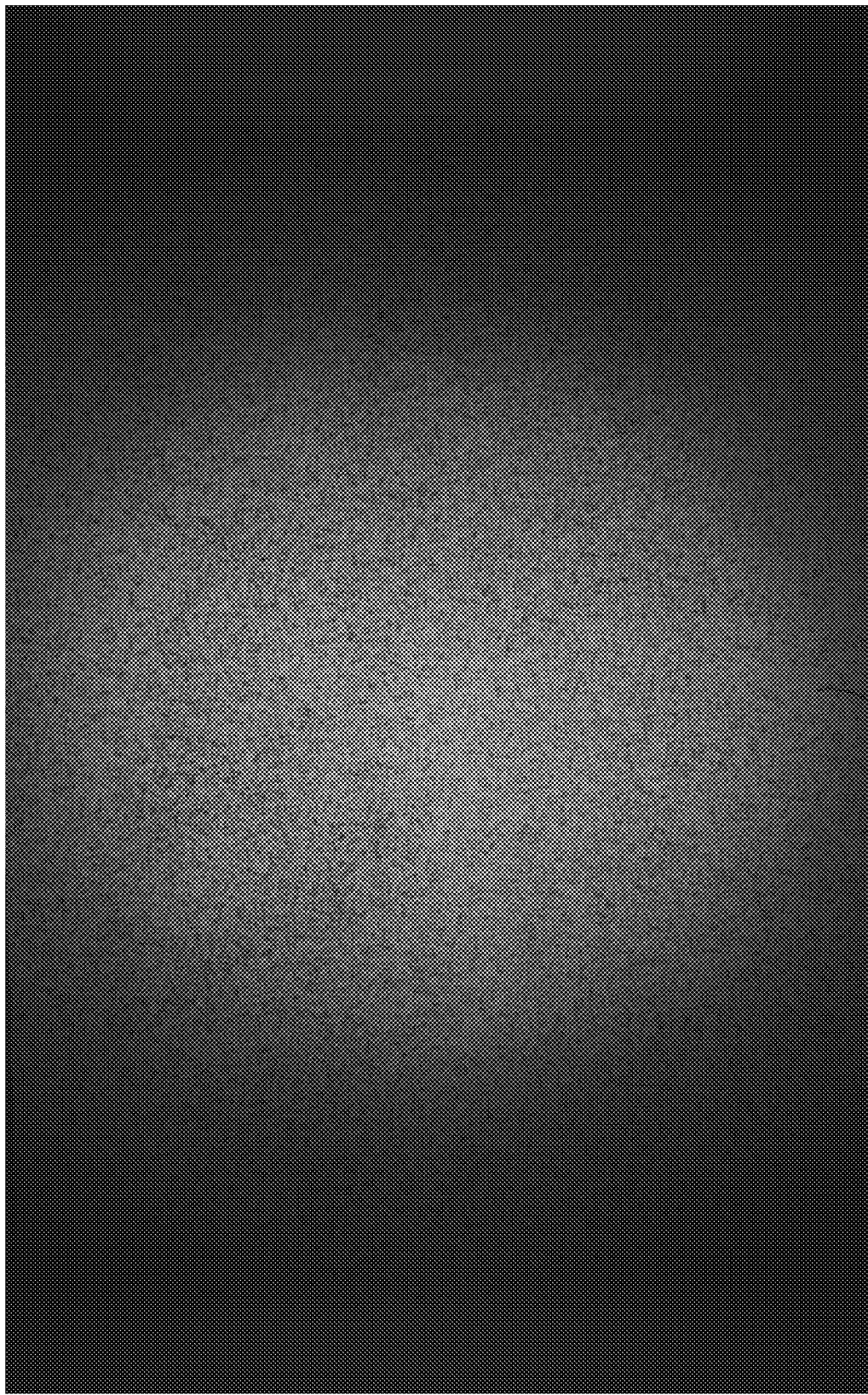
FIG. 12C is an image taken with a camera wherein the optical axis is oriented at 10 degrees off normal incidence relative to an acrylic sheet.

FIGS. 12A, 12B, and 12C show images taken with a camera 20 of an imaging unit 10 (FIGS. 2A, 2B) at 0 degrees incidence relative to an acrylic sheet 106 (i.e., with the camera axis normal to surface 108 of acrylic sheet 106). The images of FIGS. 12A-12C were generated using an imaging unit 10 (FIGS. 2A and 2B) utilizing a test setup that is substantially similar to the arrangement shown in FIG. 9. FIG. 12B is an image taken with the axis of the camera at 4 degrees off normal incidence, and FIG. 12C is an image taken with the camera axis 10 degrees off normal incidence. FIG. 12C shows that the reflection from the light source can be eliminated if the camera axis is sufficiently off a normal incidence relative to the acrylic sheet 106 (FIG. 9). Significantly, the imaging units may be positioned at, for example, 10 degrees off normal when the imaging units are aligned with windows 6 or portholes 7 (FIG. 1) to eliminate reflections that could otherwise occur. It will be understood that the same principles apply to sheets (windows) made of other materials (e.g., glass), and the acrylic sheet 106 is merely an example of a light-transmitting material.

The cameras 20 and/or 120 may optionally comprise small CMOS cameras fitted with C-mount lenses, and light from a high-intensity light source (e.g., LEDs 24, 124) may pass through a lens 25, 125 that diffuses and collimates the LED output. This light is coupled onto the camera's optical axis 13, 113 using a suitable beam-splitting device, such as a 50/50 beam-splitting prism. The illumination components, beam-splitter, and camera/imaging components optionally comprise a single, rigid imaging unit. The use of a collimating/diffusing lens to condition the LED light output provides for an illumination source that is of similar diameter to the imaging lens of the camera 20, 120. This reduces or eliminates shadows that could otherwise be projected onto the subject plane as a result of refractive index variations in the imaged volume. By coupling the light from the LED unit 24, 124 onto the camera's optical axis 13, 113, reflections from windows (which are often present in wind tunnel facilities and allow direct views of the test section) can be minimized or eliminated if the camera is placed at an angle (e.g., 8-10 degrees) of incidence relative to the surface of the window.

Figure 13:
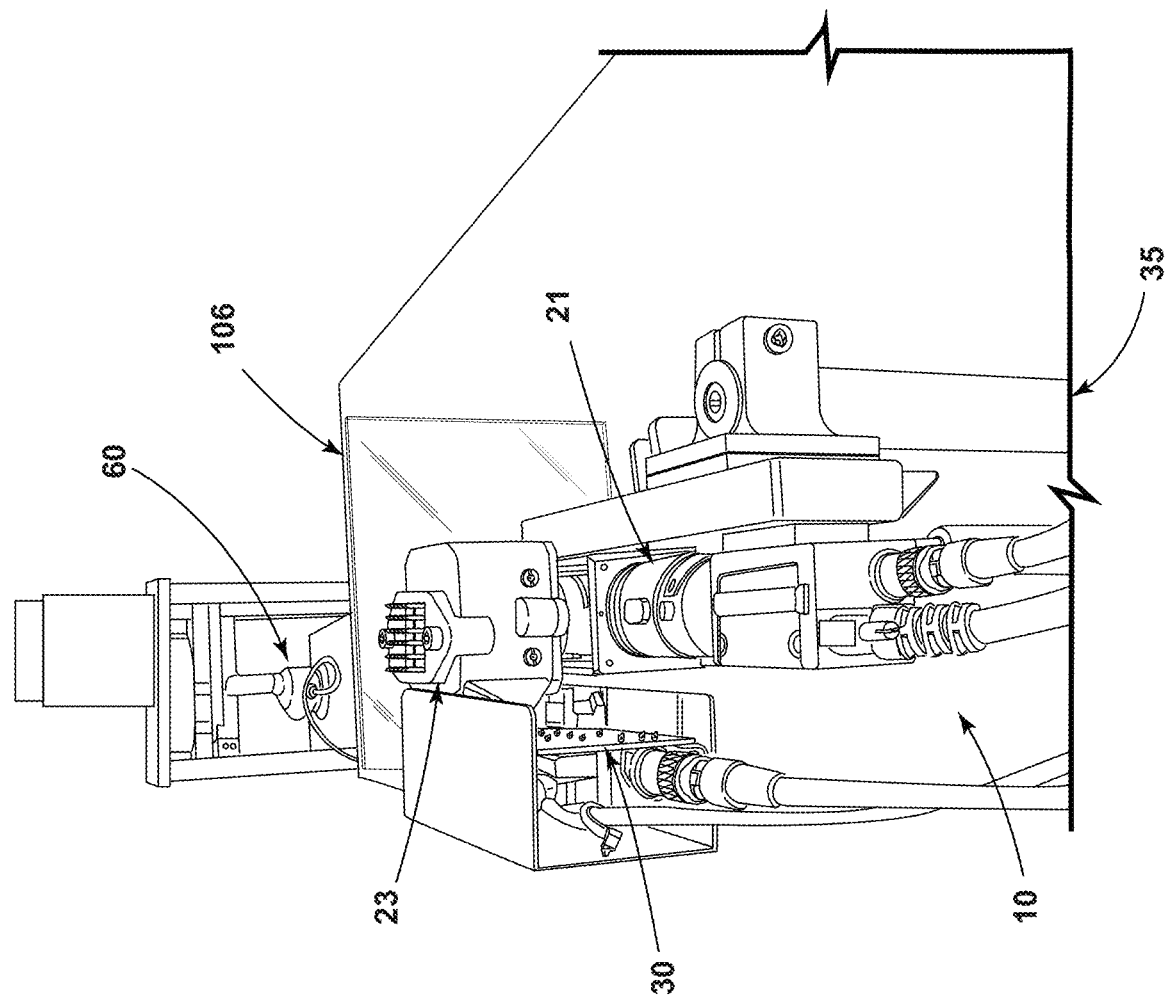
FIG. 13 is a partially fragmentary isometric view of a camera and heat gun configured to provide 2-dimensional BOS images.
Figure 15:
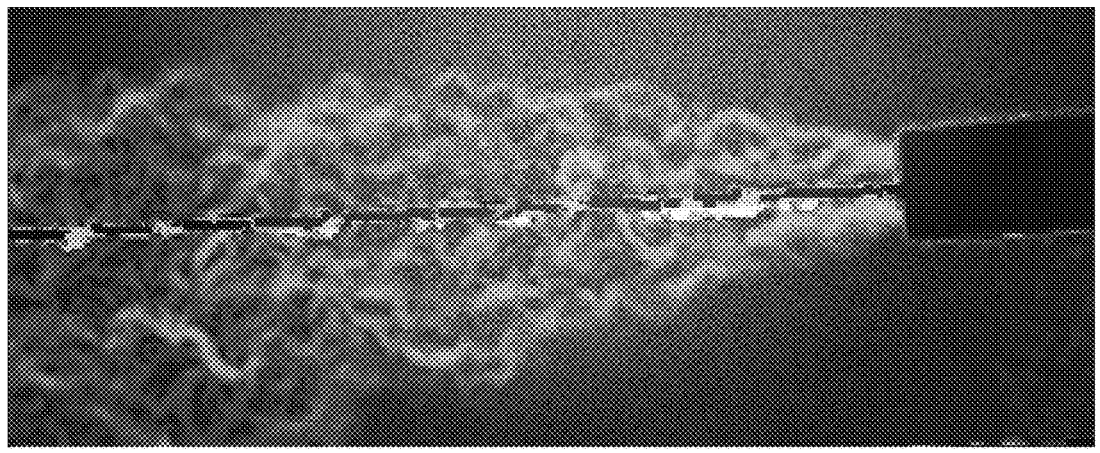
FIG. 15 is a 2-dimensional BOS image formed utilizing the setup of FIG. 13.
Figure 14:
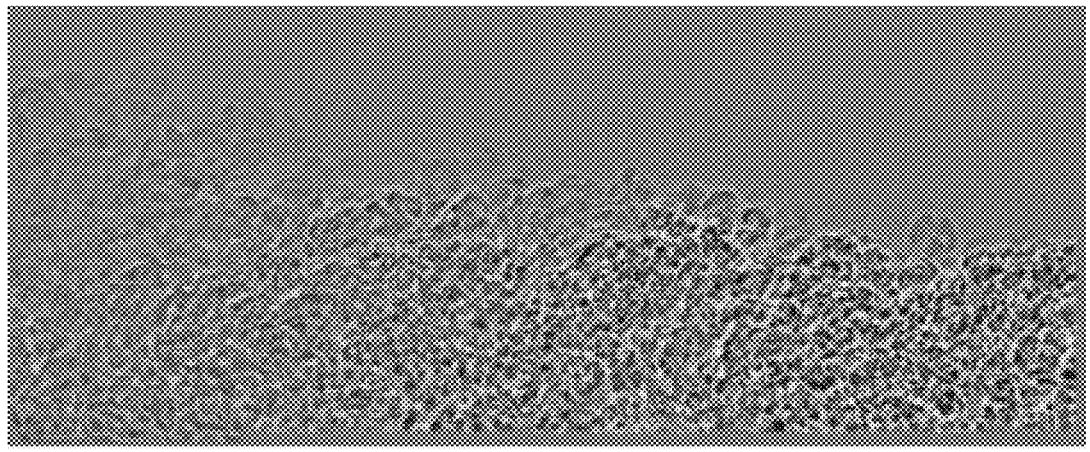
FIG. 14 is a shadowgraph image taken using the setup of FIG. 13.

With further reference to FIG. 13, a single imaging unit 10 may be positioned to generate images resulting from a heat gun 60 utilizing a retroreflective background panel 62. This setup can be utilized to provide a shadowgraph image (FIG. 14) or a 2-dimensional BOS image (FIG. 15). The images of FIGS. 14 and 15 were developed utilizing the setup of FIG. 13, and data from imaging unit 10 was processed utilizing LaVision's DaVis 10 software.

Figures 16, 17:
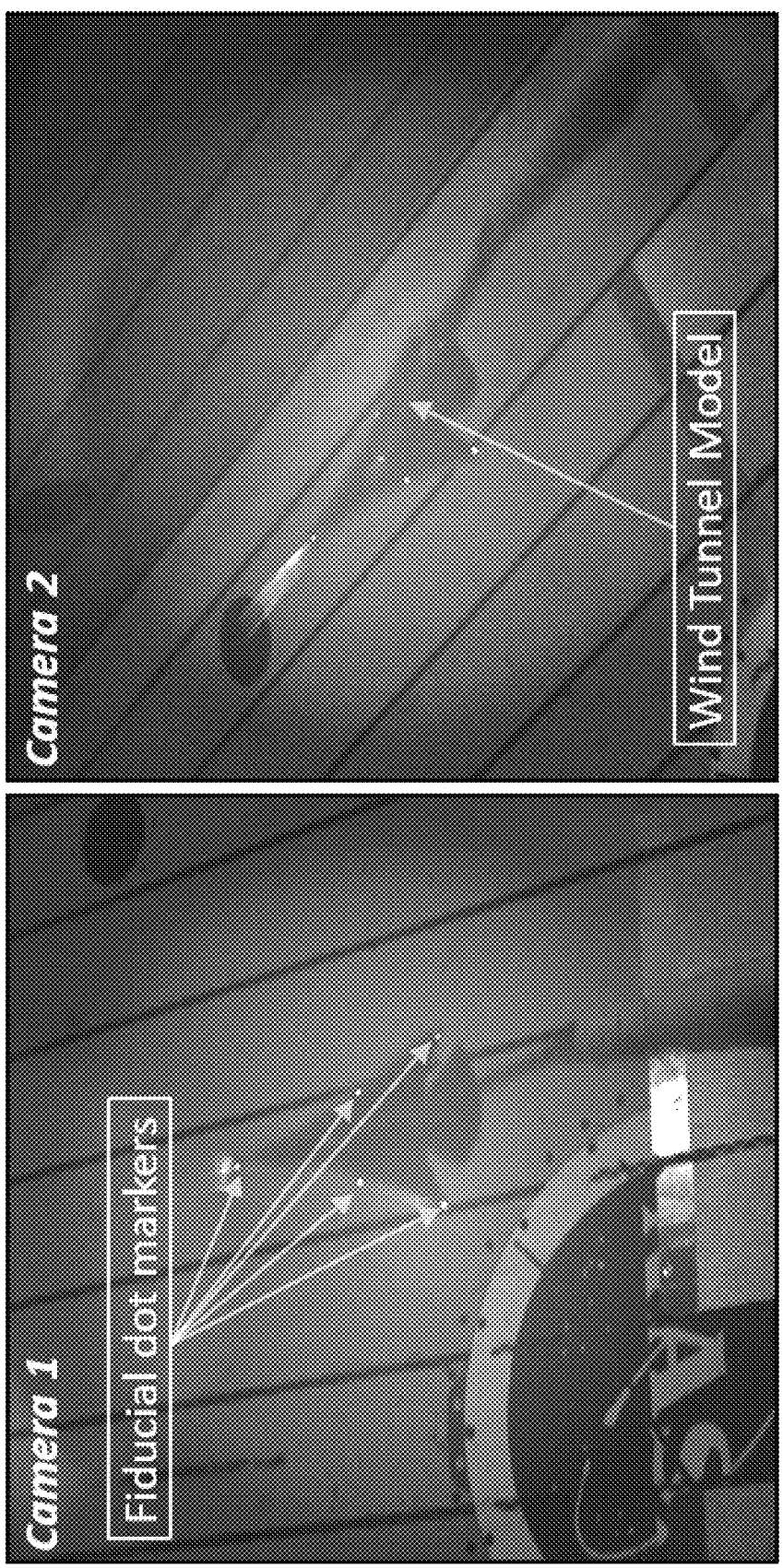
FIG. 16 is a camera image of a model in a wind tunnel taken by a first camera.
FIG. 17 is a camera image of a model in a wind tunnel taken by a second camera.
Figures 18, 19:
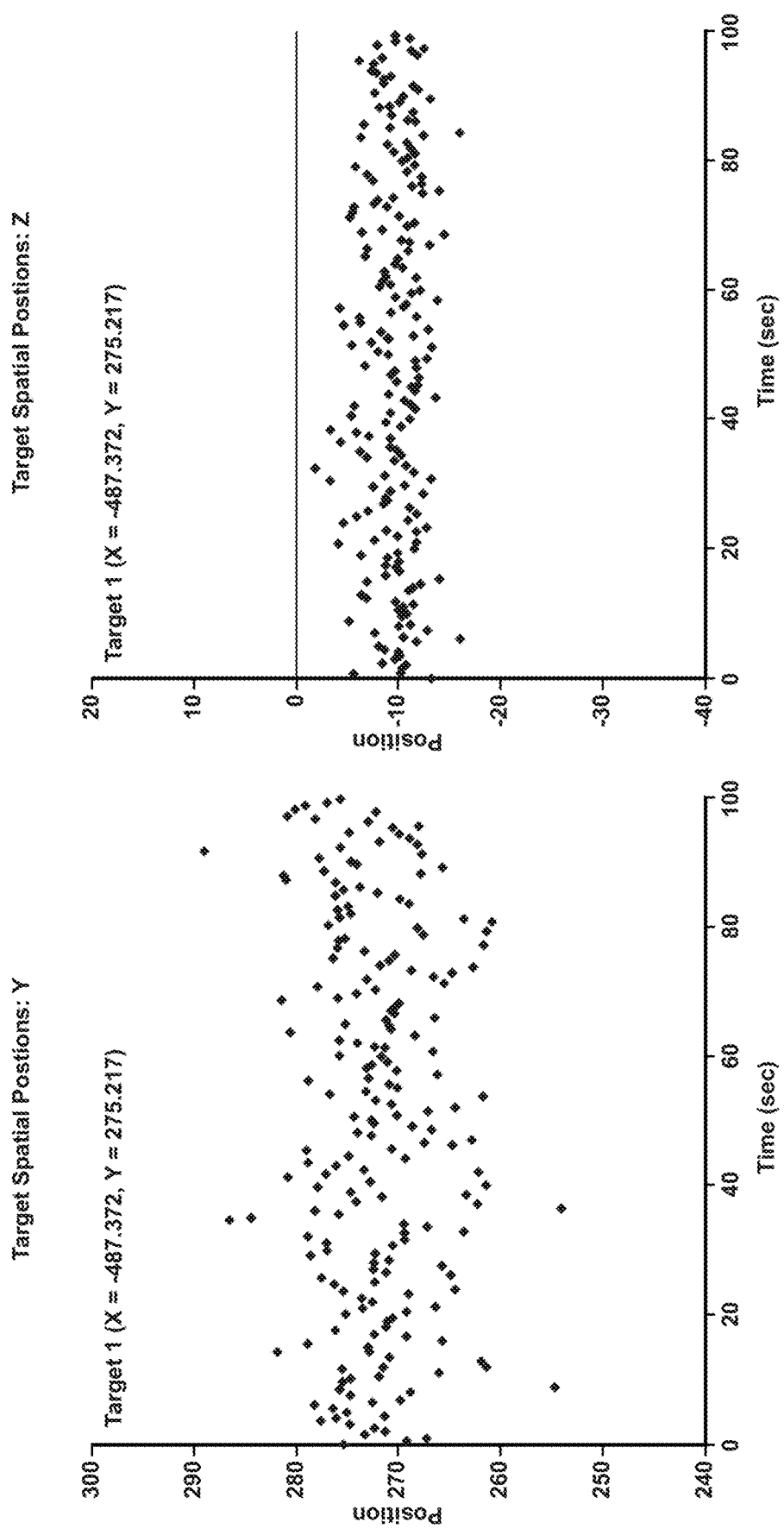
FIG. 18 is plot showing model position in the wind tunnel Y and Z coordinates in time based on measurements made with the first camera.
FIG. 19 is plot showing model position in the wind tunnel Y and Z coordinates in time based on measurements made with the second camera.

FIGS. 16 and 17 are camera images of a wind tunnel model having fiducial dot markers. FIG. 16 is an image taken utilizing a first camera, and FIG. 17 is an image of the same model taken using a second camera at a different location. The images of FIGS. 16 and 17 may be generated utilizing one or more imaging units 10 (FIGS. 2A and 2B) with the cameras aligned with windows 6 or portholes 7 (FIG. 1). FIGS. 18 and 19 are plots showing the model position in tunnel Y- and Z-coordinates in time based on the measurements made with the two camera systems.

The imaging system of the present disclosure may comprise a compact unit with a built-in illumination source that can be positioned in a plenum or other space behind a viewing port/window of a typical wind tunnel. The camera may comprise a compact CMOS camera that acquires images with sufficient resolution and bit-depth to provide high-quality BOS data for a 3-D tomographic BOS reconstruction. It will be understood that the camera data may also be utilized for 2-dimensional BOS flow visualization photogrammetry, machine vision, shadowgraphs, or other applications. The support structure (housing) of the imaging units is preferably constructed so that the output from a small LED light source may be conditioned using a diffusing lens to increase the apparent size of the light source such that it is similar in size to the diameter of the main lens of the camera or to minimize shadow effects while also concentrating the light onto the subject. The output of the light source is preferably co-linear with the optical axis of the camera due the beam-splitting device. Because the light from the light source is co-linear with the optical axis of the camera, the amount of light returned to the camera is increased when imaging a retroreflective background target in the image plane, while limiting the appearance of hard shadows formed by objects (e.g., wind tunnel models) that occlude the object plane.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An imaging system comprising:
an imaging lens;
an optical sensor defining an optical axis;
a light source;
an optical beam splitter;
a diffusing lens configured to perform at least one of diffusion and collimation of light from the light source and direct light exiting the diffusing lens to the optical beam splitter, wherein the light directed along the optical axis by the optical beam splitter has a minimum cross-sectional size that is about equal to a size of the diffusing lens;
wherein the optical beam splitter is configured to direct light from the diffusing lens along the optical axis of the optical sensor.

2. The imaging system of claim 1, wherein:
the optical sensor comprises a digital camera including an imaging lens defining a lens diameter; and
the light directed along the optical axis has a minimum diameter that is at least as large as the lens diameter.

3. The imaging system of claim 1, wherein:
The optical beam splitter comprises a 50/50 beam-splitting cube.

4. The imaging system of claim 1, wherein:
the light source comprises one or more LEDs that are configured to produce a short-duration, high-intensity illumination pulse.

5. The imaging system of claim 4, wherein:
the LED light source is configured to produce an illumination pulse of less than about 10 microseconds.

6. The imaging system of claim 1, wherein:
the optical sensor, the light source, the optical beam splitter, and the diffusing lens are rigidly interconnected to form an imaging unit.

7. The imaging system of claim 6, wherein the imaging unit is a plurality of imaging units, each imaging unit of the plurality of imaging units including an optical sensor, a light source, and an optical beam splitter, wherein the optical axes of the imaging units are radially spaced about a test region having a fluid disposed therein; and
the system further comprising:
at least one background pattern aligned with each optical axis, whereby at least some light from the light source of each imaging unit is reflected back to the optical sensor of each imaging unit, whereby the optical sensors capture images of the background patterns, wherein the images from each imaging unit comprises a 2-dimensional BOS image, whereby the synchronous images can be processed to provide a tomographic reconstruction.

8. The imaging system of claim 7, including:
a controller configured to simultaneously actuate the optical sensors and light sources of each imaging unit.

9. The imaging system of claim 8, wherein:
the optical sensors comprise digital cameras;
the light sources comprise LED light sources; and
the controller comprises electrical circuitry that is configured to generate a camera actuation signal to the digital camera followed by an actuation signal to the LED light sources whereby the electrical circuitry compensates for an actuation time delay of the digital camera relative to the LED light sources and causes the LED light sources to generate a pulse of light that is reflected back to the digital cameras when the digital cameras are actuated.

10. The imaging system of claim 7, wherein:
the optical sensors comprise digital cameras;
the light sources comprise LED light sources;
each imaging unit includes a housing, and the digital camera, LED light source, and optical beam splitter of each imaging unit are supported by the respective housing; and
each imaging unit further including an adjustable bracket having a first part connected to the housing, and a base, wherein the first part is adjustably connected to the base, whereby the first part can be rotated and translated relative to the base about three axes to a selected position.

11. The imaging system of claim 7, wherein the test region is a test region of a wind tunnel having side walls disposed about an interior space that includes the test region, the side walls including light-transmittal material forming windows, wherein the optical axis of each imaging unit is aligned with a window, and wherein the imaging units are disposed outside of the wind tunnel to capture images of material in the test region.

12. The imaging system of claim 1, wherein:
the optical sensor comprises a CMOS device;
the light source comprises a green or red LED; and
the optical beam splitter comprises a 50/50 beam-splitting plate.

13. An imaging system comprising:
a plurality of imaging units, each imaging unit including:
  a digital camera defining an optical axis;
  a light source configured to generate light traveling transverse relative to the optical axis of the digital camera;
  an optical beam splitter configured to couple light from the light source and direct a coaxial beam of light along the optical axis of the digital camera;
  a substantially rigid structure interconnecting the digital camera, the light source, and the optical beam splitter; and
  a controller configured to actuate the digital camera and the light source of the units in a substantially simultaneous manner;
wherein the imaging units are disposed about a test region with the optical axes of the digital cameras extending through the test region.

14. The imaging system of claim 13, wherein:
each imaging unit includes an aperture positioned between the light source and the optical beam splitter to block a portion of the light from the light source whereby light traveling through the aperture reaches the optical beam splitter and the coaxial beam of light is suitable for producing a shadowgraph.

15. The imaging system of claim 14, wherein:
each imaging unit includes a diffusing lens positioned between the light source and the optical beam splitter whereby light from the light source passes through the aperture and the diffusing lens.

16. The imaging system of claim 13, wherein:
a substantially rigid structure of each imaging unit comprises a housing and an adjustable mount that permits three-axis rotation and three-axis translation of the digital camera relative to a base.

17. A method of generating images, the method comprising:
providing a plurality of imaging units, each imaging unit including a digital camera defining an optical axis, a light source, and an optical beam splitter;
using the optical beam splitter to cause light from each light source to be coupled onto the optical axis of each digital camera in the form of a coaxial beam;
positioning the imaging units about a test space;
causing the coaxial beams of the imaging units to pass through a substance in the test space;
causing the coaxial beams to reflect back to the digital cameras from background patterns; and
processing data from the digital cameras to generate tomographic background-oriented schlieren images having features corresponding to pressure gradients of the substance.

18. The method of claim 17, including:
positioning the imaging units around a wind tunnel having a plurality of windows comprising light transmitting material; and
causing the coaxial beams to pass through the windows.

19. The method of claim 17, including:
activating the light sources of each imaging unit at substantially the same time to provide simultaneous pulses of light; and
actuating the digital cameras of each imaging unit at substantially the same time, whereby the digital cameras capture light reflected back from the background patterns.

* * * * *